July 2, 1957
W. M. GRUBER
2,798,157
CONTROL APPARATUS
Filed March 26, 1952
6 Sheets-Sheet 1
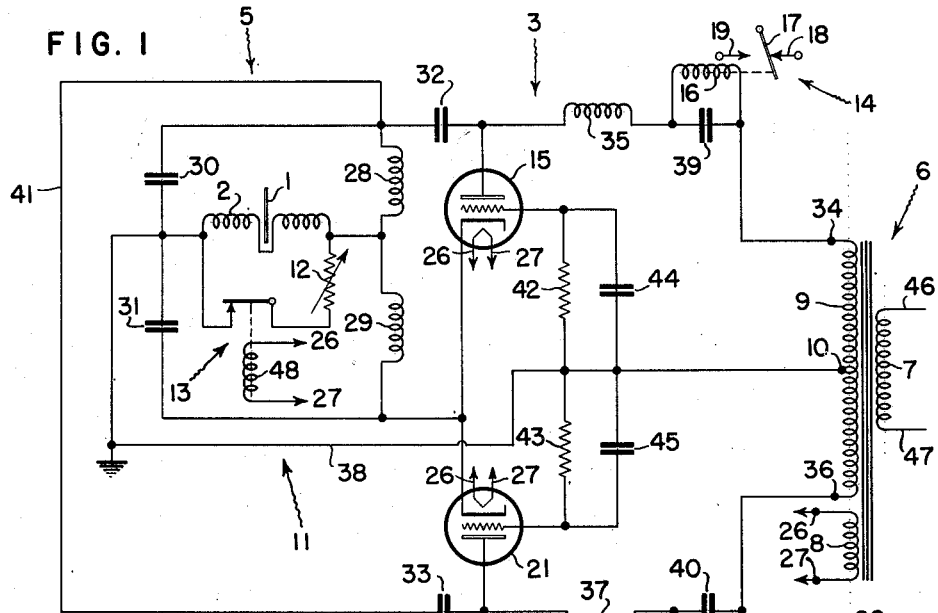
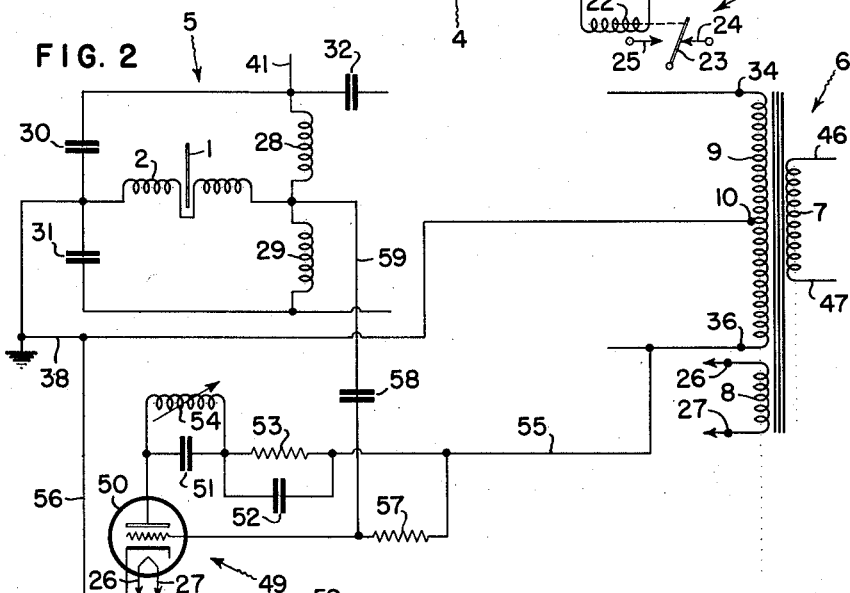
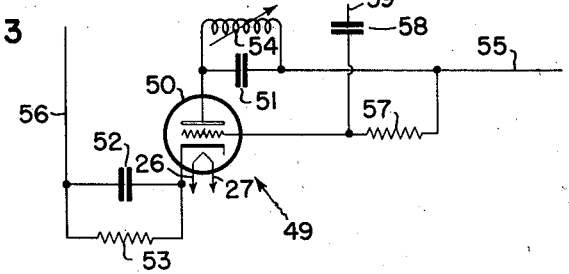
*INVENTOR.*
WARREN M. GRUBER
BY
*Arthur H. Swanson*
ATTORNEY.

July 2, 1957  W. M. GRUBER  2,798,157
CONTROL APPARATUS
Filed March 26, 1952  6 Sheets-Sheet 2
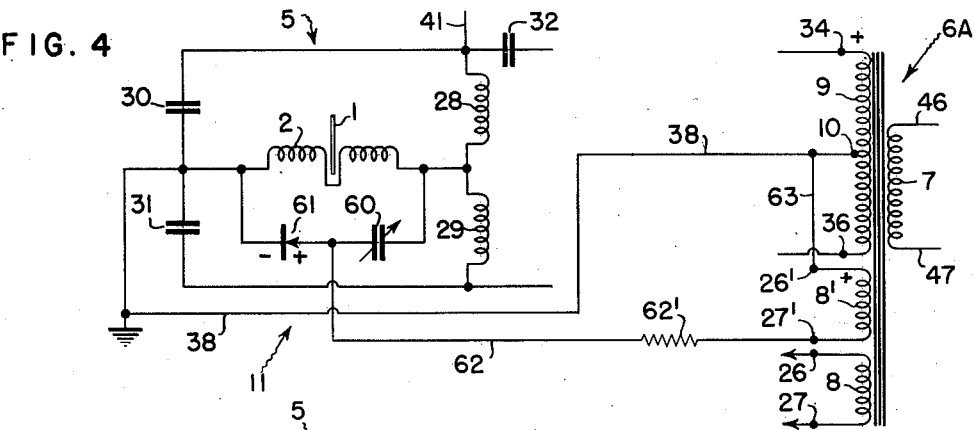
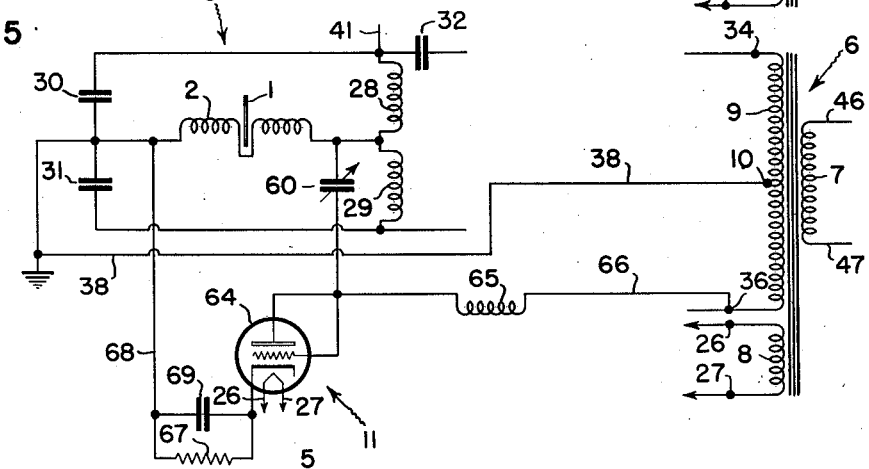
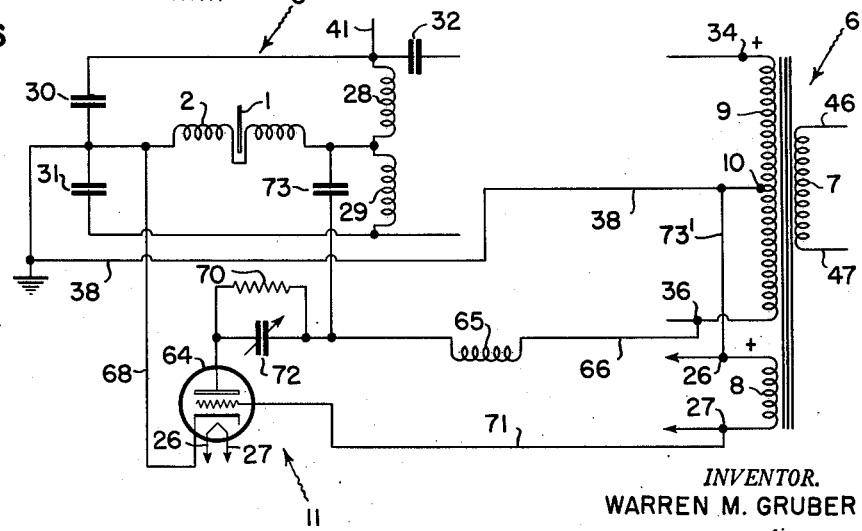
INVENTOR.
WARREN M. GRUBER
BY
ATTORNEY.

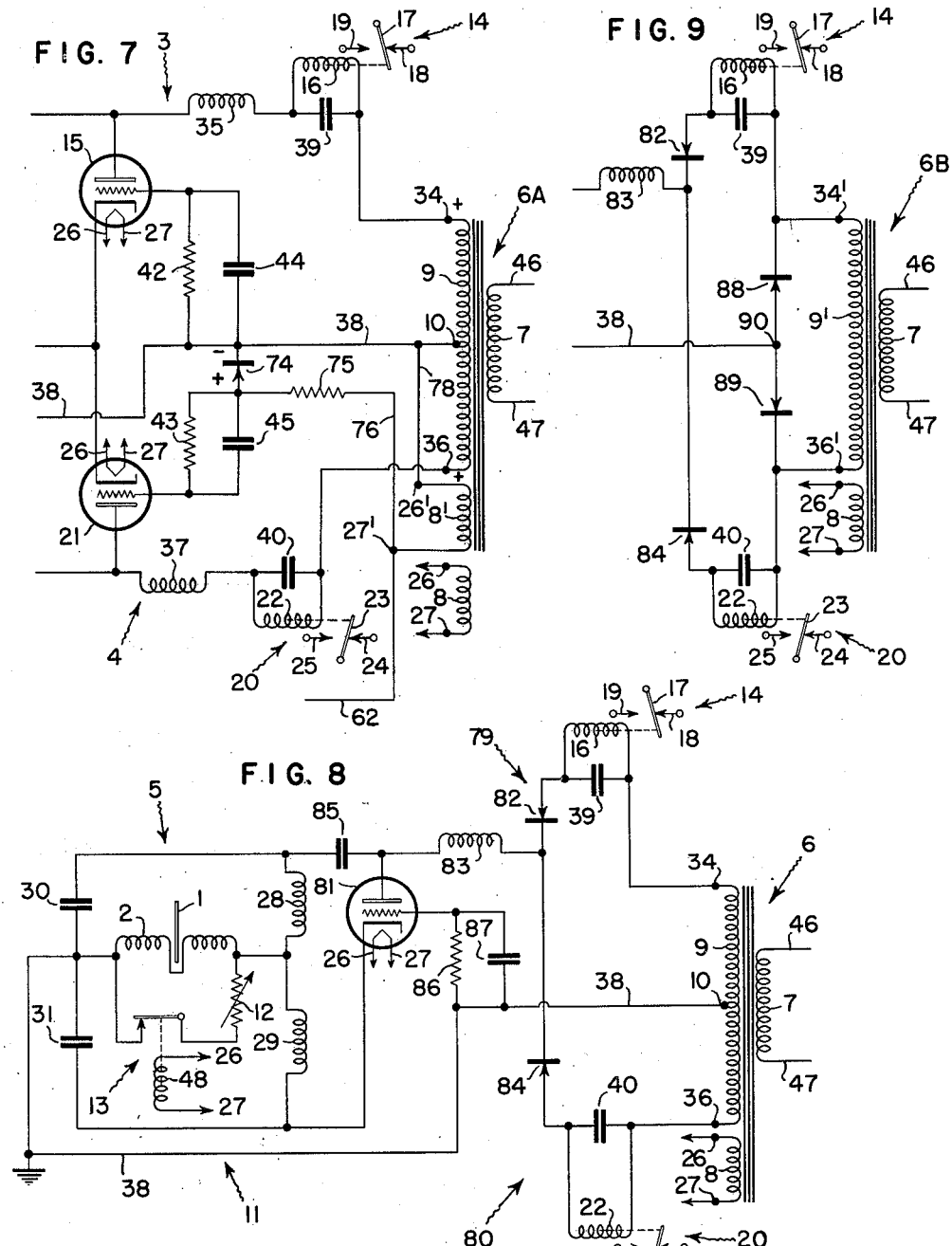

July 2, 1957     W. M. GRUBER     2,798,157
CONTROL APPARATUS
Filed March 26, 1952     6 Sheets-Sheet 4
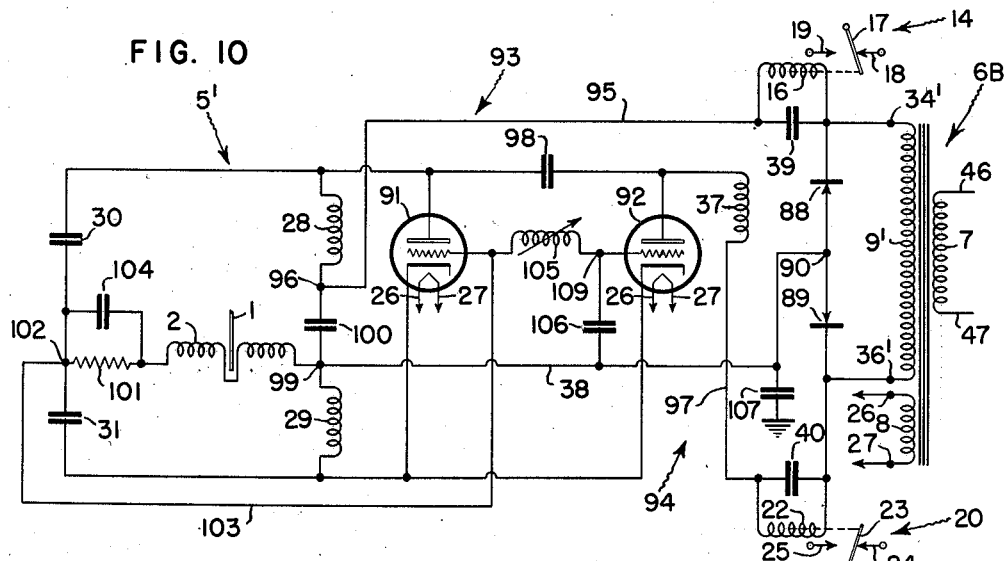
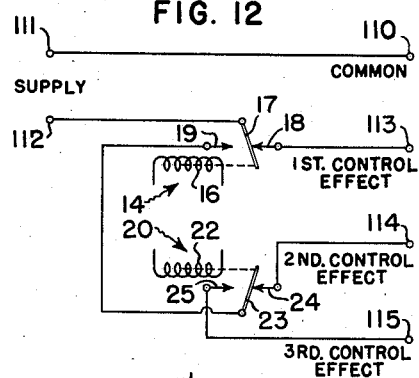
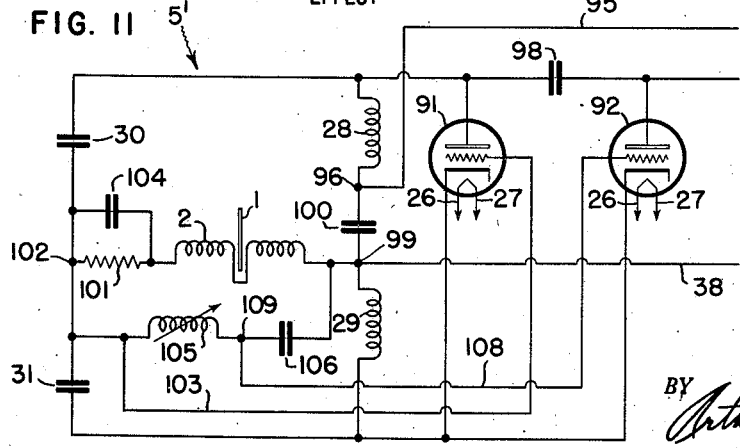
*INVENTOR.*
WARREN M. GRUBER
BY
ATTORNEY.

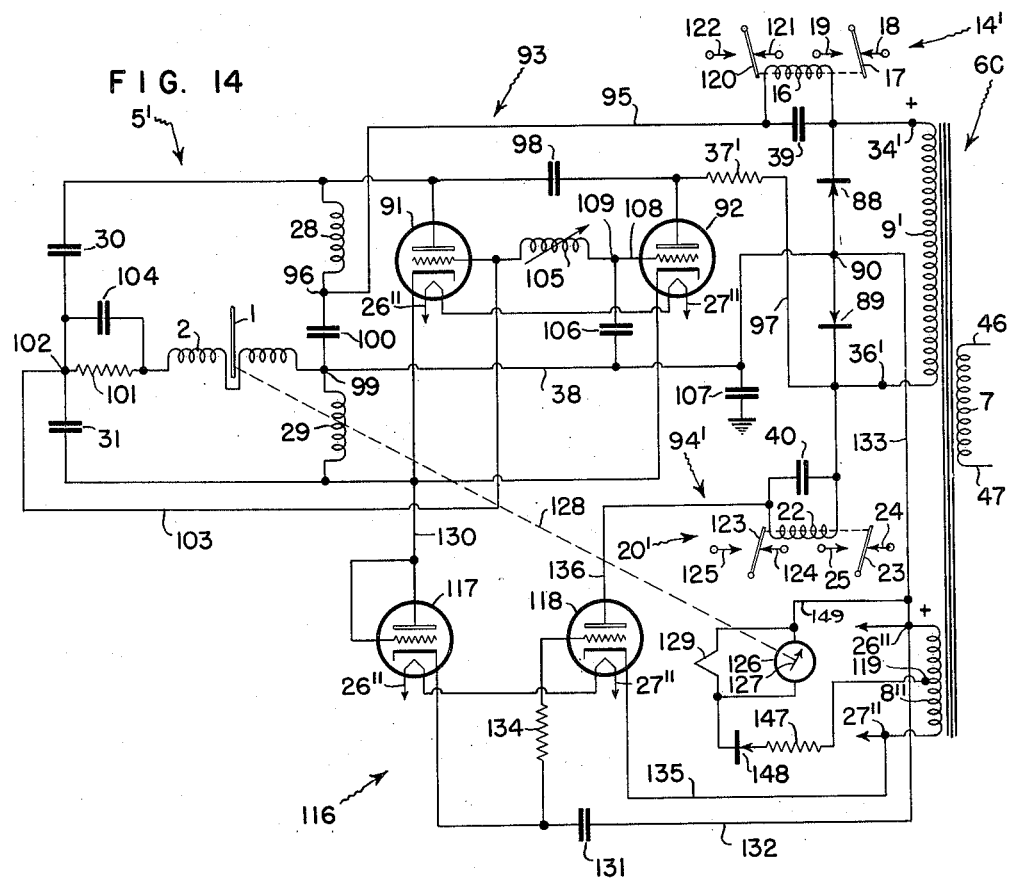

July 2, 1957  W. M. GRUBER  2,798,157
CONTROL APPARATUS
Filed March 26, 1952  6 Sheets-Sheet 6
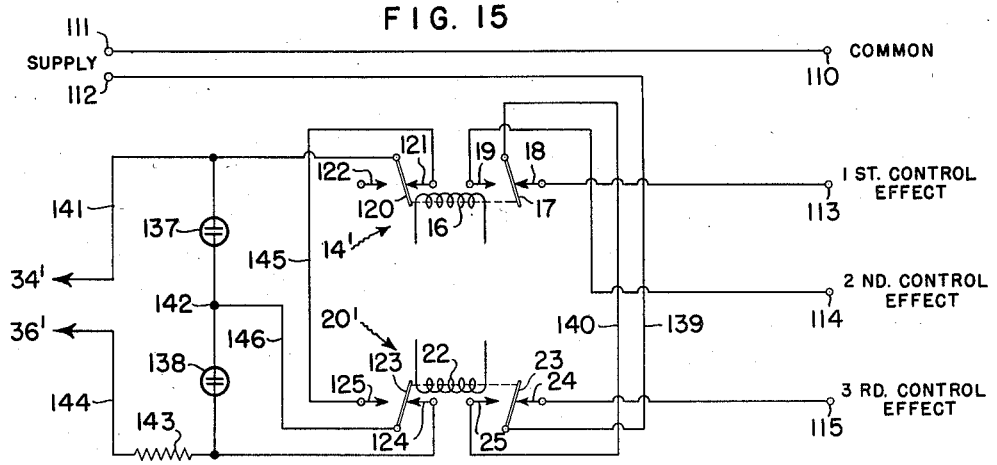
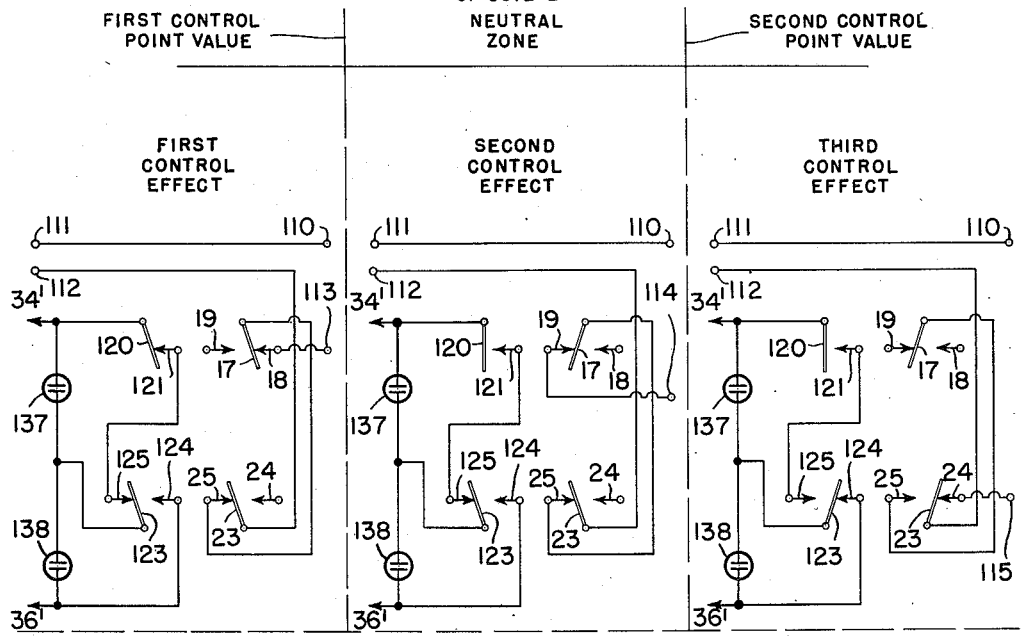
INVENTOR.
WARREN M. GRUBER
BY
ATTORNEY.

United States Patent Office 2,798,157
Patented July 2, 1957

2,798,157

CONTROL APPARATUS

Warren M. Gruber, Horsham, Pa., assignor to Minneapolis-Honeywell Regulator Company, Minneapolis, Minn., a corporation of Delaware Application March 26, 1952, Serial No. 278,565

28 Claims. (Cl. 250—36)

The present invention relates broadly to control apparatus of the three-position type, and, more specifically, relates to such control apparatus wherein an arrangement having but two distinct conditions of operation is caused to produce three distinctly different control effects. More specifically, the present invention relates to three-position control apparatus of the type just stated wherein the neutral zone or second control effect required for effecting control by the three-position method is established by automatically shifting a control point alternately between two predetermined values in synchronism with the alternate actuation of responsive means which produce the control effects.

It is a primary object of the present invention to provide improved control apparatus of the three-position type having but two distinct operating conditions and yet providing three distinctly different control effects through the medium of a synchronously shifted control point.

A more specific object of the invention is to provide improved three-position control apparatus of the type just specified wherein the control point of a device having but two distinct conditions of operation is automatically shifted alternately between two predetermined, different values in synchronism with the alternate actuation of means responsive to the condition of the device, thereby to establish the neutral zone required for effecting control by the three-position method.

It is also a specific object of the present invention to provide novel control apparatus of the three-position type noted above which is characterized by the inclusion of but a single, simple adjustable means for controlling the operation of a device having but two distinct conditions of operation as necessary to effect three-position control.

It is a further specific object of the invention to provide three-position control apparatus of the type specified above including adjustable means which is given one control point value for controlling the operation of one responsive device, and which is alternately caused automatically to have a different control point value at which the operation of a second responsive device is controlled.

An even more specific object of the invention is to provide three-position control apparatus of the type just specified which includes first and second responsive devices, each of which is permitted to be operatively energized and prevented from being so energized during alternate periods in which such energization of the other device is respectively prevented and permitted, and which includes adjustable means and control means electrically connected to the adjustable means and adapted to establish electrically a first control point value for the adjustable means during the periods in which the first device may be operatively energized, and adapted to establish electrically a different control point value for the adjustable means at which the second device may be operatively energized during the periods in which the energization of this device is permitted.

Another more specific object of the invention is to provide control apparatus of the type just described wherein the selective operation of the two responsive devices is effected by an oscillator circuit having but two distinct conditions of operation and including a separate portion individual to each of the responsive devices and a portion common to said separate portions and comprising means adjustable to permit and prevent oscillation of the oscillator circuit.

Still another specific object of the present invention is to provide apparatus as just specified wherein the responsive devices are included in separate, output portions of the oscillator circuit, wherein there are included control means adapted to energize solely one of said portions during first periods which alternate with others during which solely the other of the portions is energized, and wherein there are included other control means which are electrically connected to the common, adjustable portion of the oscillator circuit, and which are adapted solely during said first periods to establish a first control point value for the adjustable portion relative to which the operation of the first device is controlled, and which are adapted during solely said other periods to establish a different control point value relative to which the operation of the second device is controlled.

Other specific objects of the invention are to provide apparatus of the type described above wherein the alternate energization of the responsive devices by one control means is effected by the use of an alternating current energized transformer providing voltages of opposite phase, and to provide such apparatus wherein the alternate shifting of the control point value of the adjustable portion is effected electrically by the other control means through the automatic alternate connection of a suitable impedance device across a reactance element in the adjustable portion of the apparatus, or by the provision of two different values of oscillatory coupling, to each of which the apparatus is alternately responsive. Such operation may be effected by either electromagnetic synchronous switch means or by purely electrical and electronic means.

There are known in the art various devices for providing so-called "three-position" control, wherein the control apparatus is actuated into a first, a second, or a third condition, or produces a first, a second, or a third control effect, as determined by the magnitude or value of a condition to which the apparatus is responsive. In each of these arrangements, however, insofar as I have been able to determine, it was necessary either to include a device having more than two distinct operating conditions, to include a pair of separate controllers placed under the joint control of a necessarily complex controlling member, or to include two adjustable elements for actuating a single device in progressively different ways as a controlling member progressively adjusted the elements. However, the present invention utilizes no such duplicate adjustable elements or such duplicate controllers, nor does it require a device having more than two operating conditions. Therefore, numerous constructional and operating features and advantages are provided by the present invention which are not obtainable with the previously known three-position control arrangements.

Accordingly, it is a prime object of the present invention to provide control apparatus of the three-position type wherein a single adjustable member is adapted to actuate a portion into either a first or a second operating condition, and wherein the portion is common to two load devices which are operative to produce a first control effect when a condition adjusts the adjustable element to a first value, which are operative to produce a second control effect when the element is adjusted to a second value, and which are operative to produce a third control effect when the element is adjusted to a third value.

In accordance with the present invention, I provide three-position control by the use of an oscillator circuit having but two operating conditions: i. e., and oscillating condition and a non-oscillating condition. This circuit includes first and second portions and a separate responsive device, shown herein as a relay, individual to each portion. Each responsive device is adapted to assume one or another condition or position, depending upon whether the device is operatively energized or not. The operative energization of each device at any given time is in turn determined by whether or not energizing voltage is applied to the circuit portion including the device at that time, and whether or not the circuit is in oscillation at that time. The energization of said portions is advantageously controlled by one control means which is adapted to supply energizing voltage to one of the portions, but not to the other, during periods which alternate with others in which the other portion is provided with energizing voltage while the one portion is not. As will be shown, a transformer energized with alternating current and adapted to supply two alternating voltages of opposite phase is well adapted to be used in such control means.

The preferred form of apparatus also includes an adjustable portion forming a part of the oscillator circuit. This portion is common to both of the first mentioned portions, and includes a reactive element, shown as a two-part coil, the reactance of which is adjustable under the control of a cooperating part adapted to be positioned between the halves of the coil. The adjustment of said part to various positions relative to the coil varies the reactance of the coil which in turn varies the magnitude of the regenerative, oscillatory coupling provided by the portion including the coil. Accordingly, the adjustment of the reactance of the coil controls the state of oscillation of the oscillator by permitting or preventing such oscillation, and hence controls the operative energization of the responsive devices.

The three-position mode of operation is obtained in the present invention by the use of other control means which are electrically connected to the adjustable reactive element or coil and which are operative to establish electrically a first control point value of said element for the starting and stopping of oscillation of said circuit when the first of the aforementioned portions is alone provided with energizing voltage, and which are operative to establish electrically a different control point value of said element for the starting and stopping of oscillation of the circuit when the other of the portions is alone energized. Accordingly, the result is that one of the responsive devices is affected solely by the deviation between the reactance value to which the element is adjusted and the first mentioned control point reactance value of the element, while the other responsive device is controlled solely in accordance with the deviation between the reactance value to which the element is adjusted and the second control point reactance value of the element. Therefore, when the element is adjusted to a first value outside of the range embraced by the first and second control point values, each of said responsive devices will be in a given position, and a first control effect will result. When the element is adjusted to a value intermediate said first and second control point values, the position of solely one of said responsive devices will change from the first control effect position, whereby a second control effect will be produced. Finally, when the element is adjusted to a third value which is outside of said range on the opposite side from the first value, the position of the other of the responsive devices will change from that existing under the first and second control effects, but the one device will maintain the same position which it had under the second control effect, thereby providing a third control effect corresponding to said third adjusted value of the element.

As shown, the electrical establishment of two different control point values at which oscillation of the circuit is permitted and prevented is obtained by connecting a suitable impedance element, such as a resistor, a condenser, or an inductor, across the reactive element solely throughout the periods in which solely one of the oscillator circuit portions is supplied with energizing voltage. Such alternate connection and disconnection may be achieved by the use of an electromagnetic, synchronous switch or chopper which is energized for operation from the same source of voltage which energized the aforementioned energizing transformer. Alternately, a keyed electron tube or similar device may be employed in lieu of the electromagnetic switch. Further, the control means may instead consist of means for establishing two points in the common, adjustable regenerative coupling portion at which the magnitude or intensity of the coupling is appreciably different, and means for connecting each of said portions to a respective one of said points in order that the control point value of the reactive element at which oscillation is permitted and prevented will be different when one of the portions is energized from when the other portion is energized.

The various features of novelty which characterize this invention are pointed out with particularity in the claims annexed to and forming a part of this specification. For a better understanding of the invention, however, its advantages, and specific objects obtained with its use, reference should be had to the accompanying drawings and descriptive matter in which are illustrated and described preferred embodiments of the invention.

Of the drawings:

Fig. 1 is a circuit diagram illustrating a form of the present invention in which each of the oscillator portions includes a separate electron tube, and in which an electromagnetic synchronous switch alternately connects an adjustable resistor across an oscillation-controlling reactance element;

Fig. 2 is a circuit diagram illustrating a portion of a modification of the apparatus of Fig. 1 wherein the synchronous switch and adjustable resistor are replaced by an electron tube connected to perform according to the well-known "Miller Effect";

Fig. 3 is a circuit diagram illustrating a portion of a modification of the Fig. 2 apparatus wherein the load resistor for the Miller Effect tube is shifted from the anode circuit to the cathode circuit of that tube;

Fig. 4 is a circuit diagram of a portion of another modification of the Fig. 1 arrangement wherein the synchronous switch and adjustable resistor are replaced by a keyed diode rectifier and an adjustable condenser;

Fig. 5 is a circuit diagram illustrating a portion of a modification of the Fig. 4 arrangement wherein the diode rectifier is shown as a keyed diode-connected triode electron tube;

Fig. 6 is a circuit diagram of a portion of a modification of the Fig. 5 arrangement wherein the keyed electron tube is connected as a triode;

Fig. 7 is a circuit diagram of a portion of another modification of the arrangement of Fig. 4 wherein biasing means are provided for minimizing interaction between the alternately operative oscillator portions;

Fig. 8 is a circuit diagram of another embodiment of the present invention wherein a single electron tube is employed, and wherein a diode rectifier is included in each of the oscillator portions;

Fig. 9 is a circuit diagram of a portion of a modification of the apparatus of Fig. 8 wherein a second pair of diode rectifiers is employed to secure more efficient operation;

5

Fig. 10 is a circuit diagram of a preferred form of the present invention which includes a separate electron tube individual to each of the oscillator portions and which includes means for separately controlling the oscillation of each of said portions by the connection of each portion to a point of different regenerative coupling intensity;

Fig. 11 is a circuit diagram of a portion of the Fig. 10 arrangement which is redrawn to illustrate more clearly the manner in which the different coupling intensities are obtained;

Figs. 12 and 13 are diagrams which illustrate various connections and operating conditions for the arrangement of Figs. 10 and 11;

Fig. 14 is a circuit diagram illustrating a preferred modification of the arrangement of Figs. 10 and 11 which includes a desirable safe-failure portion; and Figs. 15 and 16 are diagrams which illustrate various connections and operating conditions for the arrangement of Fig. 14.

*The apparatus of Fig. 1*

The embodiments of the three-position control apparatus of the present invention illustrated herein are all of the vane-controlled oscillator type, wherein the movement of a member or vane relative to an element controls the state of oscillation of the oscillator including the element. By way of illustration and example, and not by way of limitation, the oscillator circuit chosen for illustrative purposes herein is of the common-grid type disclosed and claimed in the copending application of Warren Moore, Jr., Serial No. 106,796, which was filed on July 26, 1949, and which issued as Patent No. 2,647,252 on July 28, 1953. It is to be understood, however, that the present invention is not limited in its usefulness to control apparatus of this or any other type of vane-controlled oscillator, but is equally as well adapted when embodied in other forms of control apparatus. However, the vane-controlled oscillator form of controller is one which permits a clear and forceful explanation of the invention to be readily made, and it is for this reason that this form of control apparatus is employed for illustrative purposes herein.

The embodiment of the present invention illustrated in Fig. 1 includes a vane 1 which cooperates with a reactive element or coil 2 to vary the reactance value of the latter. The Fig. 1 arrangement also includes an oscillator circuit which in turn includes a first portion generally designated by the reference character 3, a second portion generally designated by the reference character 4, and an adjustable, common regenerative coupling or feedback portion generally designated by the reference character 5 and including the vane 1 and the coil 2. Also included in the Fig. 1 apparatus are first control means including a transformer 6 having a primary winding 7, a low-voltage secondary winding 8, and a high voltage secondary winding 9 provided with a center-tap connection 10. The arrangement also includes second control means generally designated at 11 and including an adjustable resistor 12 and an electromagnetic, synchronous switch 13.

The circuit portion 3 includes an electro-responsive device or relay 14, a triode electron tube 15, and other components and connections to be hereinafter described. The relay 14 has an operating winding 16 which, when operatively energized, causes the relay to be actuated from the dropped-out to the picked-up condition, and thereby actuates a movable contact 17 out of engagement with a normally-closed stationary contact 18 and into engagement with a normally-open stationary contact 19. Similarly, the circuit portion 4 includes an electro-responsive device or relay 20, a triode electron tube 21, and other components and connections to be described. The relay 20 includes an operating winding 22 which is operative, when suitably energized, to cause

6 the relay to be actuated from the dropped-out to the picked-up condition and to actuate a movable contact 23 out of engagement with a normally-closed stationary contact 24 and into engagement with a normally-open stationary contact 25.

Each of the triodes 15 and 21 includes anode, control grid, cathode, and cathode heater elements in the usual manner. The cathode heaters of the triodes 15 and 21 are adapted to be connected between the terminals 26 and 27 of the transformer winding 8 by partially-shown conductors, these connections being for the usual purpose of supplying cathode heater energizing current to the triodes.

The adjustable, common regenerative coupling or feedback circuit portion 5 includes the reactive element 2 and the vane 1 which operates with the element 2 to render the latter adjustable or variable as noted above. The circuit portion 5 also includes an oscillator output inductance or coil 28, an oscillator input inductance or coil 29, and tuning condensers 30 and 31. The circuit portion 5 is coupled to the portions 3 and 4 by respective coupling condensers 32 and 33.

The manner in which the various components are interconnected in the Fig. 1 arrangement will now be described. One end terminal 34 of the transformer secondary winding 9 is connected in series with the relay winding 16 and a radio frequency choke coil 35 to the anode of the triode 15, while the other end terminal 36 of the winding 9 is connected to the anode of the tube 21 through the relay winding 22 and a radio frequency choke coil 37. The cathodes of the triodes 15 and 21 are connected through the common portion 5 to a grounded conductor 38 and thence to the center-tap connection 10 of the winding 9, thus completing the load or output circuits of the triodes.

The triode load circuits can be traced individually as follows. The load circuit for the triode 15 of the circuit portion 3 can be traced from the terminal 34 of the secondary winding 9 through the relay winding 16 and the choke coil 35 to the anode of the triode 15, and from the cathode of the latter through the coil 29, the coil 2, and the conductor 38 to the center-tap connection 10 of the winding 9. Similarly, the load circuit for the triode 21 of the circuit portion 4 can be traced from the terminal 36 of the winding 9 through the relay winding 22 and the choke coil 37 to the anode of the triode 21, and from the cathode of the latter through the coils 29 and 2 and the conductor 38 to the center-tap connection 10.

A condenser 39 is connected across the relay winding 16 in the portion 3 for a purpose to be described hereinafter, while a condenser 40 is connected in parallel with the relay winding 22 in the portion 4 for an analogous purpose.

As was noted above, the adjustment of the adjustable regenerative coupling portion or circuit 5 controls the state of oscillation of the oscillator circuit: that is, controls or determines whether the circuit is or is not in oscillation when operatively energized. Therefore, the circuit 5 includes the various elements 1, 2, 28, 29, 30, and 31 which are operative, when properly adjusted, to cause the oscillator circuit to oscillate.

Before discussing in more detail the operation of the components of the circuit portion 5 in connection with the remainder of the arrangement, the connections of these components with the other components of the apparatus will be described. To this end, it is noted that the oscillator output coil 28 is connected in the oscillator output or anode-control grid circuits of the triodes 15 and 21, and hence is common to the circuit portions 3 and 4. As shown, one terminal of the coil 28 is connected through the coupling condenser 32 to the anode of the triode 15, and is connected by a conductor 41 and the coupling condenser 33 to the anode of the triode 21. The other terminal of the coil 28 is connected through the element or coil 2 to the conductor 38 and thence through respective grid bias resistors 42 and 43 to the control grids of the respective triodes 15 and 21. Grid bypass condensers 44 and 45 are respectively connected in parallel with the resistors 42 and 43.

From the foregoing it can readily be seen that the oscillator output or anode-control grid circuits of the triodes 15 and 21 include the coil 28 as a common element. To illustrate this fact further, the oscillator output circuit of the triode 15 can be traced from the anode of the triode 15, through the condenser 32, the coil 28, the coil 2, the conductor 38, and the resistor 42 and parallel connected condenser 44 to the control grid of the triode 15. Similarly, the oscillator output circuit of the triode 21 can be traced from the anode of the triode 21 through the condenser 33, the conductor 41, the coil 28, the coil 2, the conductor 38, and the resistor 43 and parallel connected condenser 45 to the control grid of the triode 21.

The oscillator input coil 29 of the circuit portion 5 is connected in the input or control grid-cathode circuit of each of the triodes 15 and 21. To this end, one end terminal of the coil 29 is connected to the cathodes of the triodes 15 and 21, and the remaining end of the coil 29 is connected to the junction between the coil 28 and the coil 2. From this point, the coil 29 is connected through the coil 2, the conductor 38, and the respective ones of the resistors and condensers 42 through 45 to the control grids of the triodes 15 and 21.

It is thus seen that the input coil 29 is connected between the cathode of each of the triodes 15 and 21 and the control grid of each of these triodes, whereby the coil 29 is common to the oscillator input or control grid-cathode circuit of each of the triodes. For added clarity, the input circuit of the triode 15 can be traced from the control grid of the triode 15 through the resistor 42 and parallel connected condenser 44, the conductor 38, the coil 2, and the coil 29 to the cathode of the triode 15. Similarly, the input circuit of the triode 21 can be traced from the control grid of the triode 21 through the resistor 43 and parallel connected condenser 45, the conductor 38, the coil 2, and the coil 29 to the cathode of the triode 21.

To complete the connections within the circuit 5, the condenser 30 is connected in parallel with the series connected combination of the coils 28 and 2, while the condenser 31 is connected in parallel with the series connected combination of the coils 29 and 2.

From the foregoing description it should be evident that the oscillator input circuits of the triodes 15 and 21 are connected in parallel to the input portion of the circuit 5, while the oscillator output circuits of the triodes 15 and 21 are connected in parallel to the output portion of the circuit 5. In other words, as noted above, the circuit 5 is an oscillation controlling portion common to the two triodes 15 and 21 and their respective circuit portions 3 and 4. Momentarily considering the circuit 5 and only one of the portions 3 and 4, e. g., the portion 3, it can readily be seen that this combination constitutes a vane-controlled, common-grid oscillator circuit of the type disclosed in the aforementioned Moore patent, wherein the reactive element or coil 2 is a common, adjustable regenerative coupling element between the oscillatory input and output circuits, and hence controls the oscillatory feedback or coupling between these circuits and the resulting state of oscillation of the oscillator circuit portion 3 including the triode 15. Similarly, the circuit 5 and the portion 4 in combination constitute a second vane-controlled oscillator of the Moore patent type which is identical to that formed by the combination of the circuit portions 3 and 5. Accordingly, each of the oscillator circuit portions 3 and 4 is controlled by the circuit 5 in the same manner as described in said Moore patent, just as though the other portion 3 or 4 were not present.

Since the construction and mode of operation of vane-controlled oscillator arrangements per se of the type described above are clearly described in detail in the aforementioned Moore patent, it is believed to be sufficient to state herein that the triodes 15 and 21 and their associated circuit portions are caused to oscillate, when operatively energized by the transformer 6, whenever the circuit 5 provides sufficient regenerative coupling to initiate and sustain such oscillation. The circuits are advantageously so arranged that the same coupling value provided by the circuit 5 which will just cause oscillation of the triode 15 circuit, when operatively energized, will also just cause oscillation of the triode 21 circuit when this circuit is operatively energized. Therefore, there is a critical value of the coupling provided by the circuit 5 above which the oscillator portions will oscillate, and below which there will be no oscillation.

As will be discussed below, the value of the coupling provided by the circuit 5 is a function of the impedance of the circuit branch including the coil 2, which impedance in turn is initially determined by the self-inductance or reactance of the coil 2 and by the impedance of any other device, such as the resistor 12, which may be connected across the coil 2. The self-inductance or reactance of the coil 2 is in turn determined by the position of the vane 1 within the space between the two halves of coil 2. Therefore, momentarily neglecting the means 11, including the resistor 12 and switch 13, there is a given position of the vane 1 relative to the coil 2, which may be called a control point position, which corresponds to a control point value of the reactance of the coil 2 which, in turn corresponds to the aforementioned critical value of the coupling produced by the circuit 5. Accordingly, if the vane 1 is out from between the halves of the coil 2 past the control point position, the adjusted reactance value of the coil 2 will be greater than the control point value, the coupling will be in excess of the critical value required, and oscillation will occur. As the vane is moved in toward the control point position, the adjusted coil reactance and coupling will decrease, but oscillation will continue until the control point position is reached. At this point, the coil reactance will be decreased below the control point value, the coupling will be decreased below the critical value, and all oscillation will cease. These last conditions will continue to exist for any position of the vane which is past the control point position in the reactance-reducing direction.

Summarizing the above, there is a single control point value for the reactance of the coil 2, in the absence of the means 11, above which value oscillation of the apparatus will be produced, and below which such oscillation will be prevented. Further, when some other element, such as the resistor 12, is connected across the coil 2, there will be a single control point value for the impedance of the combination above and below which oscillation will be respectively produced and prevented, but the control point value for the coil reactance and the control point position of the vane 1 will be different from when no such element is connected across the coil. In other words, the connection of the resistor 12 across the coil 2 will change the control point value of the reactance of the coil, above and below which value oscillation is respectively produced and prevented.

It is noted that the coils 28 and 29 of the circuit 5 may advantageously be coupled degeneratively in the Fig. 1 arrangement as is done in the apparatus disclosed in the above mentioned Moore patent for obtaining so-called "snap action" operation.

Before proceeding with a description of the operation of the Fig. 1 arrangement, certain assumptions and definitions which will simplify the subsequent description will be made. As shown, the transformer primary winding 7 is connected between supply conductors 46 and 47, and it is assumed that these conductors supply to the transformer alternating current from a suitable source. By way of example, it is assumed that the frequency of the supplied current is sixty cycles per second. The first halves of the cycles of this supply current, or voltage, will be referred to as the "first" half cycles, and it is assumed that the secondary winding terminal 34 of the transformer 6 is rendered positive with respect to the center-tap connection 10 and the other winding terminal 36 throughout these first half cycles. Accordingly, the terminal 36 will be rendered negative with respect to the terminal 34 and connection 10 during the first half of each cycle of the supply voltage.

In view of what has just been said, the first half cycles will be referred to as the operative half cycles or periods for the triode 15 and the circuit portion 3, while these half cycles or periods will be referred to as the inoperative half cycles for the triode 21 and the circuit portion 4. This terminology is clearly proper, since the anode of the triode 15 is rendered positive with respect to the associated cathode, and hence the triode 15 is capable of conduction, during the first half cycles, while the anode of the triode 21 is rendered negative with respect to the associated cathode during the first half cycles, whereby no conduction by the triode 21 can take place during these first half cycles.

In a similar manner, the other halves of each of the supply voltage cycles will be referred to as the "second" half cycles, and it is assumed that the terminal 36 is rendered positive with respect to the terminal 34 and the connection 10 throughout these second half cycles. Accordingly, the latter will be referred to as the operative half cycles for the triode 21 and circuit portion 4, since conduction of the triode 21 will be permitted during those half cycles. The latter will also be referred to as the inoperative half cycles for the triode 15 and the circuit portion 3, for obvious reasons.

In view of the foregoing description of the oscillatory portions of the Fig. 1 apparatus, and in view of the detailed description of the vane-controlled, common-grid oscillator per se given in the aforementioned Moore patent, the remainder of the description will be limited to the manner in which the oscillator operates and performs in the present invention.

Operation of the Fig. 1 apparatus

In considering the broader operating aspects of the Fig. 1 apparatus, let it first be assumed for simplification that there are no means 11 connected in parallel with the control element or coil 2. Under this condition, the operation of the oscillator circuit of Fig. 1 with its two parallel connected tubes and output portions is basically substantially the same as the operation of the original, single tube oscillator circuit of the aforementioned Moore patent. Specifically, with relation to Fig. 1, when the vane 1 is out from between the halves of the coil 2, the apparatus will be in continuous oscillation, since the triode 15 will be permitted to be conductive and to oscillate during the first half cycles of the alternating supply voltage, while the triode 21 will be permitted to be conductive and to oscillate during the alternate or second half cycles of the supply voltage. Therefore, since the triodes 15 and 21 will be caused to oscillate alternately, the net effect will be that the apparatus will be in substantially constant oscillation, whereby neither of the relays 14 and 20 will be energized sufficiently to be actuated into the picked-up position. Accordingly, the relays 14 and 20 will be maintained in the dropped-out position as shown in Fig. 1, with the respective movable contacts 17 and 23 in engagement with the associated normally-closed contacts 18 and 24 and out of engagement with the normally-open contacts 19 and 25.

If now the vane 1 is moved between the halves of the coil 2 to the control point position, at which the self-inductance or reactance of the coil 2 is reduced to the extent that there is insufficient coupling to sustain the oscillation of the apparatus, the conductivity of each of the triodes 15 and 21 will be increased sharply during the corresponding operative half cycles of the supplied alternating current in which the anode of the triode is rendered positive. This in turn will be accompanied by the operative energization of each of the relays 14 and 20 which will cause the latter to assume the picked-up position, whereby each of the movable contacts 17 and 23 will be held in engagement with the respective one of the normally-open contacts 19 and 25 and out of engagement with the respective normally-closed contacts 18 and 24.

Although it is true that the actual flow of current in each of the portions 3 and 4, as well as the conductivity of each of the triodes 15 and 21, take place solely during the operative half cycles for the respective triode, and are interrupted during the inoperative half cycles, the action of each of the condensers 39 and 40, connected in parallel with the respective relay windings 16 and 22, prevents the actual deenergization of the relays during the inoperative periods, and hence causes both of the relays to remain picked-up at all times in which the vane 1 is sufficiently far within the space between the sections of the coil 2 to be at or past the control point position, and hence prevents oscillation at all times.

The manner in which the arrangement of Fig. 1 is operative to provide control of the three-position type will now be discussed. In the first place, it should be noted that the operation of the means 11 is to shift alternately the value of the coupling provided by the circuit 5 for any given position of the vane 1. In other words, the operation of the switch 13 to connect the resistor 12 across the coil 2 and to remove the resistor 12 from this connection alternately is such as to cause any given position of the vane 1 to make the circuit 5 produce one value of coupling when the contacts of the switch 13 are closed, and to produce alternately a higher value of coupling when the contacts of the switch are open. This means that the vane 1 has a first control point position relative to the coil 2, corresponding to a first control point value for the reactance of the coil 2, when the contacts of the switch 13 are open, whereas there is a second, different control point position for the vane, and a corresponding, second control point reactance value for the coil 2, when the contacts of the switch 13 are closed. It should be noted that the reactance value of the coil 2 must be higher to produce oscillation when the contacts of the switch 13 are closed than it needs to be when said contacts are open.

Stating the above in a slightly different manner, it can be said properly that the coil 2 has a first control point value of reactance, above and below which oscillation is respectively permitted and prevented, when the contacts of the switch 13 are open, and has a second, different control point value when said contacts are closed. Since a greater value of reactance of the coil 2 must be present to produce oscillation when said contacts are closed, it can be said that the aforementioned second control point value represents a higher value of reactance than is represented by the aforementioned first control point value. Therefore, when the vane 1 is moved toward the coil 2, in the direction to decrease the coil reactance, the second control point position will be reached first, and the reactance of the coil 2 will be reduced below the second, higher control point reactance value first, whereby oscillation will be prevented at the times when the contacts of the switch 13 are closed. Likewise, further movement of the vane 1 in the same direction will thereafter cause the first control point position to be reached, and will cause the coil reactance to be reduced below the first, lower control point reactance value, whereby oscillation of the apparatus will be totally prevented, even during the periods in which the contacts of the switch 13 are open.

As shown, the synchronous, electromagnetic switch 13 includes an operating winding or coil 48 for operating its contacts. Specifically, the contacts of the switch 13 are caused to open and close once during each complete cycle of an alternating current supplied to the winding 48, being open throughout the first halves and closed throughout the second halves of the energizing current cycles. The switch 13 may be of any of a number of known, suitable forms, and may well be of the type disclosed and claimed in the Side Patent No. 2,423,524 of July 8, 1947. Accordingly, no further description of the switch 13 is deemed to be necessary herein.

In accordance with the present invention, the winding 48 of the switch 13 is energized with alternating current from the winding 8 of the transformer 6 in order to synchronize the alternate shifting of the oscillation control point with the alternate conductivity of the portions 3 and 4. To this end, the winding 48 is connected to the terminals 26 and 27 by partially shown conductors. It is assumed in the following description that the contacts of the switch are maintained in engagement or are maintained closed throughout the second half cycles of the supply voltage, and are maintained out of engagement or open throughout the first halves of those cycles. Accordingly, said contacts are closed throughout the operative half cycles of the triode 21, and hence at all times at which the triode 21 may be conductive and may oscillate, and are open throughout the operative half cycles of the triode 15, and hence, at all times at which the triode 15 may be conductive and may oscillate.

As a result of the foregoing, the circuit 5, for any given position of the vane 1, provides one value of coupling during the operative half cycles of the triode 15 and the circuit 3, and provides a different, lower value of coupling during the alternate half cycles in which the triode 21 and circuit 4 may oscillate and conduct. From this it follows that the operation of the means 11 causes the establishment of the aforementioned first control point position of the vane 1 throughout the half cycles when the tube 15 alone may oscillate, and causes the establishment of the aforementioned second vane control point position throughout the alternate half cycles in which the triode 21 alone may oscillate. Therefore, for a given vane position, the coupling produced by the circuit 5 will have a constant value throughout the half cycles in which the triode 15 may oscillate, and will have a different, lower, constant value throughout the half cycles in which the triode 21 may oscillate. The effect of this is that the triode 15 is aware solely of the first higher value of the coupling produced by the circuit 5, while the triode 21 is aware solely of the second, lower value of said coupling, all for any given position of the vane 1.

The significance of the above is readily seen. The means 11 causes the coil 2 to have one control point reactance value at the only time when the triode 15 can oscillate, and causes the coil 2 to have a different control point reactance value at the only time at which the triode 21 can oscillate. Since the means 11 alternately shifts between two predetermined values the control point reactance value of the coil 2 at which movement of the vane 1 in the appropriate direction will initiate or interrupt oscillation of the oscillator, and since the operation of the switch 13 is synchronized with the alternate energization of the circuits 3 and 4 and the triodes 15 and 21, it can be seen that one portion of the arrangement, namely that including the portions 3 and 5, the relay 14, and the triode 15, constitutes a first vane-controlled oscillator arrangement wherein the relay 14 is controlled in accordance with the position of the vane 1 relative to the first control point position, while a second portion of the arrangement, namely that including the portions 4 and 5, the relay 20, and the triode 21, constitutes a second vane-controlled oscillator arrangement wherein the relay 20 is controlled in accordance with the relationship between the position of the vane 1 and the second control point position. In other words, the oscillation of the triode 15 during its operative half cycles, and the operation of the relay 14 in accordance with the oscillatory condition of the triode 15, are under the control of the vane 1 with reference to the first control point value of the reactance of the coil 2, while the oscillation of the triode 21 during its operative half cycles, and the control of the relay 20 effected thereby, are under the control of the vane 1 relative to the second, different control point value of the reactance of the coil 2.

The manner in which the foregoing operation provides three-position control should now be readily apparent. For the conditions and under the assumptions previously stated, it will require a higher value of reactance of the coil 2 to maintain oscillation of the triode 21 than will be required to maintain oscillation of the triode 15. This difference represents the difference between the aforementioned first and second control point values for the reactance of the coil 2. Further, this difference corresponds to a range of positions of the vane 1, and a corresponding range of values for the reactance of the coil 2, within which solely the triode 15 and associated components will be caused to oscillate, within which the oscillation of the triode 21 and associated components will be prevented, and within which, therefore, solely the relay 20, but not the relay 14, will be picked-up. These ranges represent the so-called "neutral zone" which corresponds to the second or intermediate control effect in three-position control apparatus.

It is believed that the operation of the present invention can now be fully described to best advantage by the use of a specific illustration, in which the vane 1 is progressively moved from a position remote from the coil 2 to a position well within the space between the coil halves, and is then moved back to the initial position. It is believed also that the following description will illustrate conclusively the manner in which the apparatus of the present invention fulfills the several objects stated hereinbefore.

Under the foregoing assumptions, when the vane 1 is sufficiently out from between the halves of the coil 2 so that the adjusted value of the reactance of the coil 2 is such that the coupling produced by the circuit 5 is higher than that required to produce oscillation during both the first and second half cycles of the supply voltage, both of the triodes 15 and 21 will be in oscillation, and both of the relays 14 and 20 will be in the dropped-out position. This condition of the two relays may conveniently be referred to as a first control effect, and is seen to be established when the adjusted reactance value of the coil 2 is higher than the higher of the two reactance control point values alternately established by the means 11.

When the vane 1 is moved into the space between the halves of the coil 2 to a point where the coupling of the circuit 5 is just reduced below the value required to maintain the oscillation of the triode 21, the adjusted value of the reactance of the coil 2 will have been reduced below the higher of the two control point values, whereby oscillation of the triode 21 will be prevented during the second half cycles of the supply voltage. Since under no condition can the triode 21 oscillate during the first half cycles, oscillation of the triode 21 will be completely prevented, whereby the conductivity of the triode 21 during its operative half cycles will be increased sufficiently to cause the relay 20 to be actuated into the picked-up position.

Since it is assumed that the new position of the vane, at which the coupling with respect to the triode 21 is reduced below the minimum oscillatory value, is not effective to reduce the coupling with respect to the triode 15 sufficiently to interrupt the oscillation thereof during its operative half cycles, the relay 14 will remain in the dropped-out position, whereby a second control effect will be established, this effect being one in which the relay 14 is dropped-out and the relay 20 is picked-up. This second control effect is seen to be established when the adjusted reactance value of the coil 2 is within the intermediate or neutral zone, and hence is lower than the higher of the two control point values but is still higher than the lower of the two control point values.

Further movement of the vane 1 into the space between the halves of the coil 2 will further reduce the adjusted reactance value of the coil 2 and the coupling provided by the circuit 5. Since the reactance of the coil 2 will have already been reduced below the higher control point value individual to the triode 21 and below which this triode cannot oscillate, no further change in the operation thereof will occur, and the relay 20 will remain in the picked-up position. However, the vane 1 will eventually reach a position where the coupling will be reduced below the value necessary to maintain the triode 15 in oscillation. In other words, the adjusted reactance value of the coil 2 will eventually be reduced below the lower control point value, whereby the oscillation of the triode 15 will cease, and its conductivity will be increased during its operative half cycles. This will result in the actuation of the relay 14 into the picked-up position and the establishment of a third control effect wherein both of the relays 14 and 20 are simultaneously maintained in the picked-up position.

The third control effect just described is seen to be established when the adjusted reactance value of the coil 2 is made lower than the lower of the two control point values alternately established by the means 11.

If the vane 1 is now moved in a direction away from the coil 2 and out from between the halves thereof, the triode 15 will go into oscillation and the relay 14 will move to the dropped-out position as the adjusted reactance value of the coil 2 is increased above the lower of the two control point reactance values. This means that the reactance of the coil 2 will have been increased sufficiently to cause the circuit 5 to provide the required coupling for oscillation of the triode 15 during the operative half cycles therefor, in which the resistor 12 is not connected in parallel with the coil 2. Accordingly, the apparatus will be actuated from the third control effect to the second control effect by this withdrawal of the vane 1, since the reactance of the coil 2 will not as yet have been increased sufficiently to be above the higher of the two control point values, and since the relay 20 will not, therefore, have been caused to move to the dropped-out position. This means that the reactance of the coil 2 will not have been increased sufficiently to cause the circuit 5 to provide the required coupling for oscillation of the triode 21 during the operative half cycles therefor, in which the resistor 12 is connected across the coil 2.

As the vane 1 is further withdrawn from between the halves of the coil 2, a point will subsequently be reached at which the triode 21 will go into oscillation and the relay 20 will move to the dropped-out position as the adjusted reactance value of the coil 2 is increased above the higher of the two control point reactance values. This means that the reactance of the coil 2 will have been increased sufficiently to cause the circuit 5 to provide the required coupling for the oscillation of the triode 21 during the operative half cycles therefor, in which the resistor 12 is connected across the coil 2. Therefore, the apparatus will be actuated from the second control effect into the first control effect, since both of the relays 14 and 20 will now have moved to the dropped-out position.

Summarizing the foregoing, the circuit 5, which includes the coil 2, provides regenerative coupling which causes or prevents oscillation of the oscillator circuit in accordance with the deviation between the reactance value to which the coil 2 is adjusted and a control point value of the coil reactance, on one or the other side of which value oscillation is respectively permitted and prevented. The means 11, including the resistor 12 and switch 13, are connected across the coil 2, and are adapted to shift the reactance control point between predetermined first and second values alternately at the frequency of the alternating supply voltage. The transformer 6 alternately energizes the two portions 3 and 4 and their triodes 15 and 21 so as to render solely the portion 3 responsive to the state of oscillation of the circuit when the control point has the first of the two values, and so as to render solely the portion 4 responsive to the state of oscillation of the circuit when the control point has the second of the two values.

As a result, a first control effect is produced, by neither of the relays 14 and 20 being in the picked-up position, whenever the coil 2 has its reactance value adjusted by the vane 1 to a value which is greater than the higher of the two reactance control point values or which is above the range embraced by the two control point values. Further, a second control effect is produced, by the relay 20 but not the relay 14 being in the picked-up position, whenever the coil 2 has its reactance value adjusted by the vane 1 to a value which lies within the range embraced by the two control point values. Finally, a third control effect is produced, by both of the relays 14 and 20 being in the picked-up position, whenever the coil 2 has its reactance value adjusted by the vane 1 to a value which is less than the lower of the two control point values or which is below said range.

It is apparent from the foregoing that the apparatus of the present invention is operative to provide three-position control by utilizing an oscillator arrangement which is suitably actuated into and out of oscillation in such a manner as to provide the three distinct control effects required of a three-position type of control apparatus.

In order for the above described operation to take place, it is apparent that the two triodes and their circuits must be capable of going into and out of oscillation in rapid-alternation at the frequency of the supply voltage. It is required that this condition be fulfilled in order that each of the portions 3 and 4 will be responsive solely to the difference between the adjusted reactance value of the coil 2 and the respective one of the two control point reactance values established by the means 11. It is also required that the time constants of the grid bias circuits formed by the resistors 42 and 43 and the condensers 44 and 45 be sufficiently short, compared to a half cycle of the supply voltage, in order that the bias developed by one of the triodes 15 and 21 across its bias resistor when the triode is oscillating will not affect the conductivity of the other of the triodes.

As used herein, the term "control point" is seen to designate the value of the reactance of the coil 2, or the position of the vane 1 relative to the coil 2, above and below which oscillation of one or the other of the circuit portions 3 and 4 is respectively permitted and prevented. Since each circuit portion has a corresponding control point value which differs from that of the other portion, due to the conjoint action of the means 11 and the transformer 6, these control point values may properly be referred to as being alternately established electrically by the apparatus. Therefore, this use of the term "control point" differs somewhat from the use which could be made of the term to designate a mechanical adjustment made between the vane 1 and the actuated member of a measuring device, or between the coil 2 and a measuring device and vane, in order to cause the apparatus to pass from one of the control effects to another at a desired, predetermined value of the condition measured by the measuring device. Means for providing control point setting adjustments of this type would be advantageously employed in a combination of the Fig. 1 apparatus with a measuring or responsive device for positioning the vane 1, and could take any of the numerous forms known in the art.

As previously noted, the resistor 12 of the means 11 is advantageously made adjustable. This provides a means for adjusting the width of the neutral zone between the two control point reactance values for the coil 2, or between the vane positions which cause the apparatus to be actuated from the first to the second control effect, and from the second to the third control effect, respectively. Such an adjustment is possible since it is the magnitude of the resistance of the resistor 12 which determines the amount by which the reactance of the coil 2 must be increased, when the resistor 12 is connected across the coil 2, in order to maintain the same degree of coupling as exists when the resistor 12 is not so connected. Therefore, the difference between the two control point reactance values of the coil 2 is a function of the resistance of the resistor 12, whereby the latter can properly be referred to as a neutral zone width adjusting resistor.

By way of illustration and example, and not by way of limitation, it is noted that a working model of the Fig. 1 apparatus employed the following values for the components of the apparatus:

| Component | Unit | Value |
| --- | --- | --- |
| Resistor 12 | ohms | 100 |
| Resistor 42 | K. ohms | 220 |
| Resistor 43 | do | 220 |
| Condenser 30 | mmf | 25 |
| Condenser 31 | mmf | 10 |
| Condenser 32 | mmf | 2200 |
| Condenser 33 | mmf | 2200 |
| Condenser 39 | mf | 10 |
| Condenser 40 | mf | 10 |
| Condenser 44 | mf | 0.005 |
| Condenser 45 | mf | 0.005 |
| Coil 2 | microhenries | 0.5–1.0 |
| Coil 28 | do | 2.0 |
| Coil 29 | do | 2.0 |
| Coupling 28—29 | do | −0.5 |
| Relay winding 16 | ohms | 5000 |
| Relay winding 22 | do | 5000 |
| Trans. winding 9 | volts | 220–0–220 |
| Tube 15 | | ½ 12AU7 |
| Tube 21 | | ½ 12AU7 |
| Choke coil 35 | millihenries | 1.5 |
| Choke coil 37 | do | 1.5 |
| Supply voltage freq | cps | 60 |

To complete the description of the Fig. 1 apparatus, it is noted that the resistor 12 can be replaced by a suitable inductor or capacitor without changing the mode or principles of operation hereinbefore described, and that the means 11 can be connected across circuit elements other than the coil 2 without changing said operating mode and principles. The criterion is that the means 11 must be connected across such an element that the coupling provided by the circuit 5 will be alternately shifted from one value to another, by the action of the means 11, for any given position of the vane 1 and corresponding reactance value of the coil 2.

*The apparatus of Fig. 2*

I have illustrated in Fig. 2 a portion of a modification of the Fig. 1 apparatus wherein the resistor 12 and the synchronous switch 13 of the means 11 are replaced by an electron tube circuit 49 which, in Fig. 2, constitutes the means operative to shift the value of the regenerative coupling provided by the circuit 5 alternately between two predetermined values for any given position of the vane 1 and corresponding adjusted reactance value of the coil 2. Therefore, the circuit 49 is the means in the Fig. 2 arrangement which shifts the control point reactance value of the coil 2 alternately between two predetermined values.

To this end, the circuit 49 includes a triode electron tube 50 which is connected in a suitable manner with other components, to be described hereinafter, so as to exhibit the known "Miller Effect." As is well-known in the art, the grid-cathode or input impedance of a triode having a load in the anode circuit is different from the input impedance of the triode with zero anode circuit load, this phenomenon being known as the Miller Effect.

It is also well known that, if said anode circuit load is an impedance having a reactive component, the input impedance of the triode will have a resistive component.

This phenomenon or effect is utilized in the Fig. 2 arrangement to supply an impedance which can be effectively connected across and removed from the coil 2 alternately at the frequency of the alternating supply voltage. To this end, the circuit 49 includes the triode 50 which in turn includes the usual anode, control grid, cathode, and cathode heater elements. The cathode heater of the triode 50 is suitably energized by connection to the terminals 26 and 27 of the transformer winding 8. The circuit 49 also includes an anode circuit load impedance for the triode 50 comprising condensers 51 and 52, a resistor 53, and an adjustable inductor 54. One terminal of the condenser 51 is connected to the anode of the triode 50, and the other terminal of this condenser is connected through the resistor 53 and a conductor 55 to the transformer secondary winding terminal 36. This terminal constitutes one of the anode or output circuit energizing terminals for the triode 50. The inductor 54 is connected in parallel with the condenser 51, and the condenser 52 is connected in parallel with the resistor 53. The anode circuit for the triode 50 is completed by a conductor 56 which connects the cathode of the triode 50 to the conductor 38 which in turn is connected to the center-tap connection 10 of the transformer winding 9. This connection constitutes the other energizing terminal for the anode circuit of the triode 50.

The control grid of the triode 50 is connected by a resistor 57 to the anode circuit conductor 55, and is coupled to the right-hand end terminal of the coil 2, as seen in the drawing, by a condenser 58 and a conductor 59. Since the other end terminal of the coil 2 is connected to the cathode of the triode 50 by the conductors 38 and 56, it is apparent that the input impedance of the triode 50 is connected in parallel with the coil 2.

It is assumed herein that the remainder of the Fig. 2 apparatus is identical to the corresponding portions of the Fig. 1 apparatus. Accordingly, the same components appearing in each of Figs. 1 and 2 bear identical reference characters in each figure. This practice will also be followed throughout the remainder of the description of the present invention.

*Operation of the Fig. 2 apparatus*

Since the anode circuit of the triode 50 is energized with alternating current from the transformer winding 9 as shown, it is apparent that the triode 50 can be conductive solely during the aforementioned second half cycles of the supply voltage, during which the anode of the triode 50 is rendered positive with respect to the associated cathode. Accordingly, by virtue of the Miller Effect, the input impedance of the triode 50 connected across the coil 2 will have one value during the first half cycles of the supply voltage, and will have a different value during the second halves of the supply voltage cycles. Therefore, in the same manner as in the Fig. 1 arrangement, the coil 2 will have a first control point reactance value during said first half cycles, above and below which the oscillation of the triode 15 and the circuit portion 3 will be respectively permitted and prevented, and will have a second value of this control point reactance during said second half cycles, above and below which the oscillation of the triode 21 and the circuit portion 4 will be respectively permitted and prevented. The adjusted value of the inductor 54 will determine the amount that this reactance control point value will be changed during the alternate half cycles, whereby the adjustable feature of the inductor 54 provides a means for adjusting the width of the neutral zone in the Fig. 2 arrangement. The three control effects will be produced in accordance with the vane position in the manner described above in connection with the Fig. 1 apparatus.

The apparatus of Fig. 3

Fig. 3 illustrates a portion of a modification of the arrangement of Fig. 2 wherein the output circuit condenser 52 and resistor 53 of Fig. 2 are transferred in Fig. 3 to the cathode circuit of the triode 50. Accordingly, the anode circuit of the triode 50 of Fig. 3 includes only the inductor 54 and the parallel-connected condenser 51 connected between the anode of the triode 50 and the conductor 55, while the cathode circuit of the triode 50 includes the resistor 53 and parallel-connected condenser 52 connected between the cathode of the triode 50 and the conductor 56. The remaining connections of the Fig. 3 apparatus, and the operation thereof, are substantially the same as those of the Fig. 2 apparatus as described above.

The apparatus of Fig. 4

Fig. 4 illustrates a portion of another modification of the apparatus of Fig. 1, wherein the resistor 12 and switch 13 of the means 11 are replaced by an adjustable condenser 60 and a diode rectifier 61. The elements 60 and 61 are connected in series across the coil 2 and are adapted to perform the same function, of shifting the control point reactance value of the coil 2 between alternate values in synchronism with the alternating supply voltage, as is performed by the elements 12 and 13 in Fig. 1. To this end, the diode 61 is alternately energized and deenergized or keyed by a voltage which is in phase with the energizing voltage supplied to the triode 21 and circuit portion 4.

To this end, the transformer 6 of Fig. 1 is replaced in Fig. 4 by a transformer 6A. The latter has all of the same windings and terminals of the transformer 6, but has in addition a secondary winding 8' having terminals 26' and 27'. The terminal 26' is rendered positive with respect to the terminal 27' during the first half cycles of the alternating supply voltage of the conductors 46 and 47, while the terminal 27' is rendered positive with respect to the terminal 26' during the second halves of the supply voltage cycles.

The junction between the rectifier 61 and the condenser 60, which junction is connected to the positive terminal of the rectifier, is connected by a conductor 62 and a resistor 62' to the terminal 27' of the winding 8'. A conductor 63 is connected between the terminal 26' of the winding 8' and the center-tap connection 10 of the winding 9. The negative terminal of the rectifier 61 is connected to the terminal 26' of the winding 8' by virtue of its connection to the left-hand terminal of the coil 2, which in turn is connected by the conductor 38 to the center-tap connection 10. The remainder of the Fig. 4 apparatus is the same as shown in Fig. 1.

Operation of the Fig. 4 apparatus

In connection with the following description of the operation of the Fig. 4 apparatus, it is noted that the rectifier 61 has the characteristic low forward resistance in the direction of the arrow, and is conductive in this direction when the positive rectifier terminal is rendered positive with respect to the negative terminal by the voltage from the transformer winding 8'. Further, the rectifier 61 exhibits the characteristic high reverse resistance in the direction opposite to that of the arrow, whereby there is no significant current conducted by the rectifier when the negative terminal thereof is rendered positive with respect to the positive terminal. Finally, the terminal 26' of the winding 8' is positive with respect to the terminal 27' during the first half cycles of the supply voltage in which the terminal 34 is positive with respect to the connection 10 as previously noted. These instantaneous polarity relationships are shown by the plus signs adjacent the transformer windings in Fig. 4.

With reference to the foregoing assumptions, during the first half cycles of the supply voltage, the rectifier 61 will be inoperative, and the high reverse resistance thereof will be applied in series with the condenser 60 across the coil 2. The loading effect of the elements 60 and 61 across the coil 2 will be negligible at this time, and the oscillatory condition of the triode 15 and circuit portion 3 will be dependent upon the deviation between the adjusted reactance value of the coil 2 and a first control point value of this reactance.

During the second half cycles of the supply voltage, at which time the terminal 27' of the winding 8' is rendered positive with respect to the terminal 26', the rectifier 61 will be conductive, whereby the low, forward resistance of the rectifier and the condenser 60 will be effectively connected in series across coil 2. The resulting loading effect will require the coil 2 to have a greater reactance value in order that the circuit 5 can produce sufficient coupling to produce oscillation, whereby a second, higher control point value of reactance for the coil 2 will be established at the times in which the triode 21 and circuit portion 4 are operatively energized.

It will be evident from the foregoing that the keyed operation of the rectifier 61 is substantially the same as the operation of the synchronous switch 13 in the Fig. 1 apparatus. Hence, it can be seen that the circuit 11 of Fig. 4 constitutes means operative to shift the control point reactance value of the coil 2 between two predetermined values alternately at the supply voltage frequency and in synchronism with the alternate operative energization of the circuit portions 3 and 4 and their triodes 15 and 21. By adjusting the capacitance value of the condenser 60, the width of the neutral zone of the Fig. 4 apparatus can be adjusted in a manner analogous to that in which the neutral zone width is adjusted in the Fig. 1 apparatus by the adjustment of the resistance of the resistor 12.

By way of illustration and example, it is noted that, in a working model of the apparatus of Fig. 4, the rectifier 61 was a crystal diode of the 1N34 type, the condenser 60 had an adjustable capacity of from four to twelve mmf., and the resistor 62' had a resistance of 10K ohms. The values for the remainder of the components of the Fig. 4 apparatus model were the same as those listed hereinbefore in connection with the Fig. 1 apparatus.

The apparatus of Fig. 5

The apparatus illustrated in Fig. 5 is a modification of a portion of the Fig. 4 apparatus wherein the rectifier 61 is shown as being a triode electron tube connected as a keyed diode. To this end, the means 11 of Fig. 5 include a triode electron tube 64 having the usual anode, control grid, cathode, and cathode heater elements. The cathode heater of the triode 64 is connected for energization by the transformer winding 8 in the conventional manner. The anode of the triode 64 is directly connected to the control grid thereof for diode operation, and is connected through a radio frequency choke coil 65 and a conductor 66 to the terminal 36 of the transformer winding 9. The cathode of the triode 64 is connected through a resistor 67 and a conductor 68 to the end of the coil 2 which is connected to the conductor 38. Accordingly, the cathode of the triode 64 is connected to the center-tap connection 10 of the winding 9 by the conductor 38. A bypass condenser 69 is connected in parallel with the resistor 67. The connections are completed by the connection of the condenser 60 between the remaining, right-hand end of the coil 2 and the anode and control grid of the triode 64.

It can readily be seen from the foregoing that the diode-connected triode rectifier 64 and the condenser 60 are connected in series across the coil 2 in the same manner as the condenser 60 and rectifier 61 are so connected in the arrangement of Fig. 4. In Fig. 5, the keying voltage for the rectifier is taken from across the lower half of the transformer winding 9 instead of from across a winding 8' as is done in Fig. 4. Aside from the use of the transformer 6 in lieu of the transformer 6A of Fig. 4,

19 the remainder of the apparatus of Fig. 5 is identical to the corresponding portions of the apparatus illustrated in Fig. 4. Accordingly, the operation of the Fig. 5 apparatus is substantially identical to the operation of the Fig. 4 apparatus described above.

The apparatus of Fig. 6

In Fig. 6 there is illustrated a portion of a modification of the Fig. 5 apparatus wherein the keyed electron tube 64 is connected as a triode, rather than as a diode. To this end, the anode of the triode 64 in Fig. 6 is connected through a plate load resistor 70 and the choke coil 65 and conductor 66 to the transformer winding terminal 36, while the control grid of the triode 64 is connected by a conductor 71 to the terminal 27 of the transformer winding 8. As shown, the terminals 36 and 27 are simultaneously rendered positive with respect ot the center-tap connection 10 during the second half cycles of the supply voltage as in the previous arrangements. An adjustable condenser 72 is connected in parallel with the resistor 70, and the cathode of the triode 64 is directly connected to the left-hand end of the coil 2 by the conductor 68. A condenser 73 connects the junction between the resistor 70 and the choke coil 65 to the right-hand end of the coil 2. The terminals 26 and 10 are joined by a conductor 73'. The remainder of the Fig. 6 apparatus is the same as that of Fig. 5.

Operation of the Fig. 6 apparatus

Since the anode-cathode circuit of the triode 64 is effectively connected in series with the condenser 73 and the parallel-connected resistor 70 and condenser 72 across the coil 2, the operation of the Fig. 6 arrangement is substantially identical to the operation of the apparatus shown in Fig. 5. In Fig. 6, the conductivity of the triode 64 is prevented during the first half cycles of the supply voltage by the connection of the triode control grid to the then negative terminal 27 of the winding 8, and by the connection of the triode anode to the then negative terminal 36. During the second half cycles, the triode 64 is rendered conductive, and the forward resistance thereof appears across the coil 2 in series with the parallel-connected elements 70 and 72 and the condenser 73. As before, this condition shifts the control point reactance value of the coil 2 to a new value during the second half cycles of the supply voltage. Adjustment of the capacity of the condenser 72 adjusts the width of the neutral range obtained with the Fig. 6 apparatus.

The apparatus of Fig. 7

There is shown in Fig. 7 a portion of another modification of the apparatus of Fig. 4 wherein there are included means, including a rectifier 74, which are operative, when the apparatus establishes the second control effect, to assure that the oscillation of the triode 15 during the first halves of the supply voltage cycles will not interfere with or disturb the high conductivity of the triode 21 during the second half cycles. As shown in Fig. 7, the grid bias components 42 and 44 for the triode 15 are connected to the conductor 38 as before, but the grid bias components 43 and 45 for the triode 21 are not so connected. Instead, the last mentioned components are connected by a resistor 75 and a conductor 76 to the terminal 27' of the secondary winding 8' of the transformer 6A. The terminal 26' of the winding 8' is rendered positive with respect to the terminal 27' throughout the first half cycles of the alternating supply voltage, while the terminal 27' is rendered positive with respect to the terminal 26' throughout the second half cycles of the supply voltage, as previously explained. The terminal 26' is connected to the center-tap connection 10 of the winding 9 by a conductor 78.

The rectifier 74 is connected between the conductor 38 and the junction between the resistor 43, the condenser 45, and the resistor 75. As shown, the polarity of the rectifier is such that the latter is adapted to be

20 conductive in the direction of the arrow for current flow toward the conductor 38 away from the last mentioned junction. The remainder of the apparatus of Fig. 7 is seen to be identical to the corresponding portions of Fig. 4 apparatus.

Although the interaction prevention feature of Fig. 7 has been shown combined with apparatus of the type shown in Fig. 4, it should be understood that this feature is equally applicable to the other forms of the invention illustrated herein where different means for alternately shifting the control point reactance value of the coil 2 are utilized.

Operation of the Fig. 7 apparatus

The basic operation of the Fig. 7 apparatus is identical with that described in connection with the Fig. 4 apparatus. That is, when the adjusted reactance value of the coil 2 is higher than the high control point reactance value associated with the triode 21, each of the triodes 15 and 21 will oscillate during its operative half cycles, and neither of the relays 14 and 20 will be in the picked-up position. Therefore, the aforementioned first control effect will exist. Further, movement of the vane 1 to a position wherein the adjusted reactance value of the coil 2 is made to lie between said high control point reactance value and the low control point reactance value associated with the triode 15 will still permit the triode 15 to oscillate during its operative half cycles, but will prevent oscillation of the triode 21 at all times. As previously explained, this causes the relay 20 to be adjusted to the pick-up position while the relay 14 remains in the dropped-out position, whereby the aforementioned second control effect is established. The third control effect is established as before when the adjusted reactance value of the coil 2 is made lower than the lower control point value for this reactance and oscillation of the triode 15 is prevented at all times.

In the absence of the rectifier 74 and the resistor 75 and connection 76, it can sometimes occur under certain conditions that the conductivity of the triode 21 and the operative energization of the relay 20 are interfered with by the oscillation of the triode 15 when the second control effect is produced. Specifically, under certain conditions, it has been found that the oscillation of the triode 15 during the first half cycles will affect the conductivity of the triode 21 during the second half cycles in which the triode is rendered conductive but non-oscillating.

This interaction can be traced to the fact that the triode 15, when oscillating, sometimes tends to place a charge on the grid condenser 45 of the triode 21 which renders the control grid of the triode 21 negative with respect to the associated cathode. Moreover, this charge may persist during the second half cycles, which are the operative half cycles for the triode 21, whereby the conductivity of the triode 21 may be sufficiently limited to prevent the required operative energization of the relay 20, even though the triode 21 itself is not oscillating. This obviously results in the failure of the triode 21 to maintain the relay 20 in the picked-up position when it should be, and causes the apparatus to be improperly actuated from the second control effect back to the first control effect.

It is to prevent such interaction that the elements and connections 74 through 76 and 78 are included in the Fig. 7 apparatus. Thus, the connection of the resistor 43 and condenser 45 of the triode 21 to the terminal 27', which is negative with respect to the conductor 38 during the operative half cycles for the triode 15, prevents the oscillation of the triode 15 from placing a negative charge on the condenser 45, a negative charge being one which would adversely limit the conductivity of the triode 21 during the alternate, operative half cycles for the triode 21. Accordingly, the triode 15, while oscillating, is prevented from charging the grid condenser 45 of the triode 21 in a manner which would affect the desired picked-up position of the relay 20.

During the second half cycles, which are the operative half cycles for the triode 21, the terminal 27' is rendered positive with respect to the conductor 38. This causes current to flow through the conductor 76, the resistor 75, and the rectifier 74 in the conductive direction of the latter, whereby the rectifier 74 essentially connects the resistor 43 and condenser 45 directly to the conductor 38 as is done in the previously described arrangements. Therefore, the operation of the triode 21 and the circuit portion 4 is not significantly affected during the operative half cycles of the triode 21, but is positively prevented from being adversely affected during these operative half cycles by the oscillation of the triode 15 during the operative half cycles of the latter.

The apparatus of Fig. 8

In Fig. 8 I have illustrated another embodiment of the present invention wherein a single triode electron tube and a pair of diode rectifiers are utilized in lieu of the two triodes employed in the Figure 1 apparatus. Aside from this difference, the Fig. 8 apparatus is quite similar to that of Fig. 1 and, insofar as the operation of the relays 14 and 20 in response to the position of the vane 1 is concerned, there is no difference between the operation of the arrangements of Figs. 1 and 8.

As shown in Fig. 8, the apparatus thereof includes the regenerative coupling circuit 5, the means 11 including the resistor 12 and the synchronous switch 13, the relays 14 and 20, and the transformer 6, all as in Fig. 1. Additionally, the Fig. 8 arrangement includes a first portion 79, a second portion 80, and a triode electron tube 81. The latter has the usual anode, control grid, cathode, and cathode heater elements, the cathode heater being operatively energized by the transformer winding 8 in the same manner as in the Fig. 1 arrangement.

The circuit portion 5 and the triode 81 constitute a vane-controlled oscillator combination which is substantially identical to either of the combinations of Fig. 1 formed by the circuit 5 and one of the triodes 15 and 21. The oscillator arrangement so formed in Fig. 8 is common to the two circuit portions 79 and 80, each of which is seen to constitute a separately energized load or output circuit for the oscillator. To this end, the portion 79 includes a connection from the transformer winding terminal 34 through the winding 16 of the relay 14, a diode rectifier 82, and a radio frequency choke coil 83 to the anode of the triode 81. Similarly, the portion 80 includes a connection from the transformer winding terminal 36 through the winding 22 of the relay 20, a diode rectifier 84, and the choke coil 83 to the anode of the triode 81. The output circuits 79 and 80 are completed by the connection of the cathode of the triode 81 through the coils 29 and 2 of the circuit 5 and through the grounded conductor 38 to the center-tap connection 10 of the transformer winding 9. The condensers 39 and 40 are connected across the respective relay windings 16 and 22 as in the Fig. 1 arrangement.

As noted above, the circuit 5 is connected to and cooperates with the triode 81 in substantially the same manner as the circuit 5 is connected to and cooperates with either of the triodes 15 and 21 in the Fig. 1 apparatus. Specifically, the anode of the triode 81 is connected by a coupling condenser 85 to one end terminal of the oscillator output coil 28, the other terminal of which is connected through the coil 2, the conductor 38, and a grid bias resistor 86 to the control grid of the triode 81. A grid bypass condenser 87 is connected in parallel with the resistor 86. The cathode of the triode 81 is connected through the oscillator input coil 29 and the coil 2 to the conductor 38 as hereinbefore noted. The tuning condensers 30 and 31 are connected across the coils 28 and 2, and 29 and 2, in the same manner as in Fig. 1. Also as in Fig. 1, the resistor 12 and switch 13 of the means 11 are connected in series across the coil 2.

As shown, the positive terminal of the rectifier 82 is the terminal thereof which is connected to the transformer winding terminal 34, while it is the positive terminal of the rectifier 84 which is connected to the transformer winding terminal 36. Therefore, the first half cycles of the supply voltage, throughout which the terminal 34 is positive with respect to the connection 10, are the operative half cycles for the portion 79, while the second half cycles, throughout which the terminal 36 is positive with respect to the connection 10, are the operative half cycles for the portion 80. No current can flow through the portion 79 during the second half cycles, since the terminal 34 is then negative with respect to the connection 10, and the rectifier 82 prevents significant current flow from being produced by the positive relationship between the terminal 36 and the connection 10. In the same manner, the portion 80 cannot conduct any significant current during the first half cycles, since the terminal 36 is negative with respect to the connection 10 at these times, and the rectifier 84 prevents the positive relationship between the terminal 34 and the connection 10 from producing any significant current flow through the portion 80. It is assumed, as it was in connection with the Fig. 1 arrangement, that the transformer primary winding 7 is supplied with alternating current at a frequency of sixty cycles per second from the conductors 46 and 47. It is also assumed that the contacts of the switch 13 are open throughout the first half cycles of the alternating supply voltage, and are closed throughout the second half cycles thereof.

Operation of the Fig. 8 apparatus

During the first halves of the supply voltage cycles, throughout which the terminal 34 is positive with respect to the connection 10, the contacts of the switch 13 are open, whereby the triode 81 and associated components are caused to oscillate or are prevented from oscillating depending upon the relationship between the adjusted reactance value of the coil 2 and the low control point reactance value for the coil which is established when the aforementioned contacts are open. Since solely the circuit portion 79, but not the circuit portion 80, can conduct current during the first half cycles, the state of oscillation of the triode 81 controls the operative energization of solely the relay 14, whereby the latter is actuated into the picked-up position whenever the triode 81 does not oscillate during the first half cycles, and is maintained in the dropped-out position when the triode 81 is caused to oscillate during the first half cycles. From this it can be seen that the operation of the relay 14 is controlled solely with reference to the low control point reactance value, this value resulting from the fact that a low adjusted reactance value for the coil 2 is sufficient to produce oscillation of the apparatus when the contacts of the switch 13 are open.

During the second halves of the supply voltage cycles, the contacts of the switch 13 are closed, whereby a higher value of the adjusted reactance of the coil 2 is required to cause oscillation of the apparatus. Since solely the circuit portion 80, but not the circuit portion 79, can conduct current during these second half cycles, the operation of the relay 20 is under the control of the oscillatory state of the triode 81 solely with reference to the higher control point reactance value. Therefore, the relay 20 will be maintained in the dropped-out position when the triode 81 is caused to oscillate during said second half cycles, and will be operatively energized and actuated into the picked-up position whenever the triode 81 is prevented from oscillating during the second half cycles.

With the foregoing relationships in mind, it can be seen that the triode 81 will oscillate during both the first and second half cycles, and both of the relays 14 and 20 will be maintained in the dropped-out position, whenever the vane 1 is sufficiently out from within the halves of the coil 2 so as to cause the adjusted reactance value of the coil 2 to be higher than the higher of the two control point reactance values. In accordance with the previous description, the first control effect is thereby established in the apparatus.

When the vane 1 is moved to a position in which the adjusted reactance value of the coil 2 is reduced below the higher control point value, but is maintained higher than the lower control point value, the triode 81 will oscillate only during the first half cycles, and will be prevented from oscillating during the second half cycles, whereby the relay 20 will be actuated into the picked-up position. Thus, the relay 20 is controlled solely with reference to the higher of the two control point values established by the means 11. Since the relay 14 will remain in the dropped-out position because of the continued oscillation of the triode 81 during the first half cycles, the second control effect will be established by the apparatus.

Further movement of the vane 1 to a position which reduces the adjusted reactance value of the coil 2 to below the lower control point value, which is individual to the circuit portion 79, will cause the triode 81 to be prevented from oscillating during the first half cycles, as well as during the second half cycles. Accordingly, the relay 14 will be actuated into the picked-up position, and the third control effect will be established.

It is apparent from the above that the response of the relays 14 and 20 to the deviation between the adjusted reactance value of the coil 2 and solely a corresponding one of the two control points values established by the means 11 is the same as the response of the relays 14 and 20 in the other forms of the present invention treated hereinbefore. In the Fig. 8 apparatus, however, the rectifiers 82 and 84 cooperate with the transformer 6 as means operative to cause the alternate energization of the two circuit portions 79 and 80, and hence to cause each of these circuit portions to be responsive to the state of oscillation of the triode 81 solely when the corresponding control point reactance value is in effect. As is the case with the other forms of the present invention previously described, the condensers 39 and 40 cooperate with the associated relay windings 16 and 22 to prevent a relay which is operatively energized during the operative half cycles of its circuit portion from being actuated into the dropped-out position during the alternate, inoperative half cycles.

The apparatus of Fig. 9

I have illustrated in Fig. 9 a portion of a modification of the Fig. 8 apparatus wherein the transformer 6 of Fig. 8 is replaced by a transformer 6B, and wherein diode rectifiers 88 and 89 are included. The transformer 6B includes the same primary winding 7 and secondary winding 8 included in the transformer 6, but has an untapped secondary winding 9' in lieu of the winding 9 of the transformer 6. The winding 9' has terminals 34' and 36' between which the developed voltage is assumed to be the same as that produced between the terminal 34 and the connection 10 of the transformer 6 when the transformers 6 and 6B are energized with the same primary winding voltage. It is also assumed that the terminal 34' is positive with respect to the terminal 36' during the first halves of the supply voltage cycles, and that the terminal 36' is positive with respect to the terminal 34' during the second halves of the supply voltage cycles.

The aforementioned rectifiers 88 and 89 have their positive terminals connected together at a junction 90, and the grounded conductor 38 is connected to this junction. This connection is analogous to the connection of the conductor 38 to the center-tap connection 10 in the previously described forms of the present invention. The negative terminal of the rectifier 88 is connected to the secondary winding terminal 34', and the negative terminal of the rectifier 89 is connected to the secondary winding terminal 36'. The conductive directions of the rectifiers 88 and 89 are shown by the directions of the arrows in the usual manner.

The connections just described provide a positive energizing voltage between the terminal 34' and the junction 90 during the first half cycles of the supply voltage, and provide a positive energizing voltage between the terminal 36' and the junction 90 during the second half cycles of the supply voltage. During each half cycle, the voltage developed across the entire winding 9' is utilized, whereby more efficient operation is obtained than that provided with the arrangements previously described wherein only one half of the winding 9 provides useful energizing voltage during any given half cycle. Since the remainder of the apparatus partly shown in Fig. 9 is identical to the corresponding apparatus of Fig. 8, the operation of the Fig. 9 arrangement is the same as that described above in connection with Fig. 8.

Although the Fig. 9 modification has been illustrated in connection with the Fig. 8 arrangement, it is to be understood that the transformer 6B and the rectifiers 88 and 89 can be employed in the other embodiments of the present invention, disclosed herein, in the same manner as these elements are utilized in the arrangement of Fig. 9.

The apparatus of Fig. 10

In Fig. 10 there is illustrated a preferred form of the present invention which includes two triode electron tubes, each of which is connected in a separate portion of an oscillator circuit. The Fig. 10 apparatus also includes a means for separately controlling the oscillation of each of the circuit portions which differs from the means employed in the various forms of the present invention described up to this point. Briefly, the Fig. 10 apparatus includes means operative to establish two different control point reactance values for the coil 2 by providing an alternately different amount of regenerative coupling for each of the two triodes and their circuit portions as the circuit portions are alternately energized and de-energized.

Fig. 10 therefore includes a first triode electron tube 91, a second triode electron tube 92, and a common, regenerative coupling circuit 5' for the two triodes. Each of the triodes 91 and 92 includes the usual anode, control grid, cathode, and cathode heater elements. The cathode heater of each of the triodes is connected to the transformer winding 8 for energization therefrom in the usual manner.

Also included are the relays 14 and 20, and the energizing and energization controlling means of Fig. 9, including the transformer 6B and the rectifiers 88 and 89. The relay 14 is associated with the triode 91 in a first circuit portion 93 which is effectively energized from the terminal 34' and the junction 90 and hence has the first half cycles of the supply voltage for its operative half cycles. Similarly, the relay 20 is associated with and controlled by the triode 92, these elements being included in a second circuit portion 94 which is effectively energized from the terminal 36' and the junction 90 and hence has the second half cycles of the supply voltage as its operative half cycles. Therefore, the triodes 91 and 92 and the associated portions 93 and 94 are alternately energized in the same basic manner as the triodes 15 and 21 and their circuit portions 3 and 4 are alternately energized in the apparatus of Fig. 1. It is assumed that the conductors 46 and 47 supply alternating current at a frequency of 60 cycles per second to the winding 7 as in the previously described arrangements.

The coupling circuit 5' of Fig. 10 is substantially the same as the circuit 5 of Fig. 1, but has its components arranged in a slightly different manner. However, the coupling circuit 5' is common to the triodes 91 and 92, and hence to the circuit portions 93 and 94, as was the case for the circuit 5 and the triodes 15 and 21 and circuit portions 3 and 4 of the Fig. 1 arrangement. It can be seen from Fig. 10 that the circuit 5' is series-fed with respect to the triode 91 and is shunt-fed with respect to the triode 92, whereas both of the oscillator circuit portions of Fig. 1 are of the shunt-fed type. However, whether the apparatus of Fig. 10, or that of Fig. 1, is series-fed or shunt-fed is immaterial for the purposes of the present invention.

To achieve the foregoing relationships, the terminal 34' is connected by the winding 16 of the relay 14 and a conductor 95 to a junction 96 in the circuit portion 5'. The oscillator output coil 28 is connected from the junction 96 to the anode of the triode 91, and the cathode of the latter is connected by the oscillator input coil 29 and the conductor 38 to the junction 90, which is the negative supply or energizing voltage terminal of the apparatus. The circuit 5' is thus series-fed in the portion of the arrangement including the triode 91, the circuit 93, and the circuit 5'.

In addition, the terminal 36' is connected by the winding 22 of the relay 20, a conductor 97, and the choke coil 37 to the anode of the triode 92, while this anode is connected by a coupling condenser 98 to the anode of the triode 91 and thence to the coil 28. The cathode of the triode 92 is connected by the coil 29 of the circuit 5' and the conductor 38 to the junction 90. Accordingly, the circuit 5' is shunt-fed in the portion of the apparatus including the triode 92, the circuit 94, and the circuit 5'.

The junction between the coil 29 and the conductor 38 has been designated as 99, and is connected to the junction 96 by a bypass condenser 100. The junction 99 is also connected through the coil 1 and a grid bias resistor 101 to a junction 102, from where a conductor 103 is connected to the control grid of the triode 91. A grid bypass condenser 104 is connected in parallel with the resistor 101. In the same manner as for the grid bias elements of the previously described arrangements, the time constant for the combination of the bias resistor 101 and the condenser 104 must be small compared to a half cycle of the supply voltage in order to prevent the oscillation of one of the triodes 91 and 92 from affecting the operation of the other of the triodes.

The tuning condenser 30 is connected between the anode terminal of the coil 28 and the junction 102, while the tuning condenser 31 is connected between the junction 102 and the cathode terminal of the coil 29. These connections complete the circuit portion 5'.

An adjustable inductor or coil 105 is connected between the control grid of the triode 91 and the control grid of the triode 92. The latter control grid is connected by a condenser 106 to the conductor 38 which in turn is connected to ground by a bypass condenser 107. The inductor 105 and the condenser 106 cooperate with the elements of the circuit 5' to provide two points of different coupling intensity in the apparatus as will be subsequently described.

For added clarity, the load or output circuit of the triode 91 can be traced from the terminal 34' and through the winding 16, conductor 95, and coil 28 to the anode of the triode 91, and from the cathode thereof through the coil 29 and the conductor 38 to the junction 90. Similarly, the load circuit for the triode 92 can be traced from the terminal 36' and through the winding 22, conductor 97, and choke coil 37 to the anode of the triode 92, and from the cathode thereof through the coil 29 and the conductor 38 to the junction 90.

The oscillator output or anode-control grid circuit for the triode 91 can be traced from the anode of the triode 91 through the coil 28, the condenser 100, the coil 2, the parallel-connected resistor 101 and condenser 104, and the conductor 103 to the control grid of the triode 91. In a similar manner, the oscillator output circuit of the triode 92 can be traced from the anode thereof through the condenser 98, the coil 28, the condenser 100, the coil 2, the parallel connected resistor 101 and condenser 104, the conductor 103, and the inductor 105 to the control grid of the triode 92.

Finally, the oscillator input or control grid-cathode circuit for the triode 91 can be traced from the control grid thereof through the conductor 103, the parallel-connected resistor 101 and condenser 104, the coil 2, and the coil 29 to the cathode of the triode 91, while the oscillator input circuit of the triode 92 can be traced from the control grid thereof through the inductor 105 to the control grid of the triode 91 and thence to the cathode of the triode 92 by the same path just outlined.

It should be apparent from the circuits just traced that each of the combinations of the circuit 5' and the corresponding one of the triodes 91 and 92 constitutes a vane-controlled oscillator arrangement of the general type utilized in the foregoing embodiments of the present invention and presented in the aforementioned Moore patent. Thus, if the elements 105 and 106 are momentarily disregarded and it is assumed that the control grid of the triode 92 is directly connected to the conductor 103 and thence to the junction 102 in the circuit 5', the operation of the Fig. 10 apparatus can be said to be substantially identical of the operation of the Fig. 1 apparatus when the effect of the resistor 12 and switch 13 is disregarded. Consequently, if the control grid of the triode 92 were directly connected to the control grid of the triode 91, there would be but a single control point reactance for the coil 2 which would correspond to a single minimum value of coupling to cause oscillation of the two oscillator portions including the triodes 91 and 92. There would then be but one control point position for the vane 1 relative to the coil 2, and vane positions on either side of this control point position would respectively cause the oscillation of both of the triodes or the oscillation of neither of the triodes depending upon which side of the control point position the vane was on. This in turn would enable the apparatus to produce but two control effects, one with both of the relays in the dropped-out position, as shown in Fig. 10, and the other with both of the relays in the picked-up position.

However, as previously mentioned, the inductor 105 and condenser 106 cooperate with the circuit portion 5', the triodes 91 and 92, and the remainder of the apparatus to establish two different control point reactance values alternately and in synchronism with the alternate energization of the circuit portions 93 and 94. The manner in which the inductor 105 and condenser 106 cooperate with the other elements of the apparatus to perform this function by establishing a different coupling value for each of the triodes 91 and 92 for any given position of the vane 1 can be seen better with reference to Fig. 11, wherein a portion of the Fig. 10 apparatus circuit has been redrawn so as to illustrate more clearly the specific relationships between the elements 105 and 106 and the elements of the circuit portion 5'.

From Fig. 11 it can readily be seen that the inductor 105 and the condenser 106 are connected in series between the junctions 99 and 102 of the circuit portion 5'. In other words, the inductor 105 and condenser 106 are connected in series across the series combination of the coil 2 and the resistor 101 with its parallel connected condenser 104. Therefore, since the magnitude of the regenerative coupling produced by the circuit 5' is essentially a function of the magnitude of the reactance between the junction 99 and the control grids of the triodes 91 and 92, it will be seen that, for any given position of the vane 1 and any given value for the inductor 105, the junction 102 will represent one value of regenerative coupling with respect to the junction 99, while the junction 109 between the inductor 105 and the condenser 106 will represent a different value of regenerative coupling with respect to the junction 99. In other words, for any given set of adjustments, a different amount of coupling will be obtained by the connection of a control grid of one of the triodes to the terminal 102 than will be obtained by such connection to the terminal 109. However, the control grid of the triode 91 is permanently connected directly to the junction 102 by the conductor 103, while the control grid of the triode 92 is permanently connected by a conductor 108 to the junction 109. Accordingly, the state of oscillation of the triode 91 is controlled solely in accordance with the degree of regenerative coupling obtained from the junction 102, while the state of oscillation of the triode 92 is controlled solely in accordance with the degree of coupling obtained from the junction 109.

The significance of the above is believed to be obvious. It is thus seen that the triode 91 will be caused to oscillate or will be prevented from oscillating at any given time during its operative half cycles, which are the first half cycles of the supply voltage, depending upon whether or not there is sufficient regenerative coupling provided by the circuit 5' at the junction 102 at that time. Similarly, the triode 92 will be caused to oscillate or will be prevented from oscillating at any given time during its operative half cycles, which are the second halves of the supply voltage cycles, depending upon whether or not the circuit 5' provides sufficient regenerative coupling at the junction 109 at that time. For purposes of illustration, it will be assumed throughout the remainder of the description that the values of the various components are so related that a given position of the vane 1 between the halves of the coil 2 produces a higher value of regenerative coupling at the junction 109 than is provided at the junction 102.

By providing points of different coupling 102 and 109 individually associated with the triodes 91 and 92 and their associated circuit portions 93 and 94, two different control point reactance values for the coil 2 are established in the apparatus, each of which values is individual to a respective one of the triodes 91 and 92. Hence, it can be seen that the apparatus of Fig. 10 includes means which perform a function which is basically the same as that performed by the means 11 in the forms of the present invention already described. With reference to Figs. 10 and 11, the control point reactance value individual to the triode 91 is that value of the reactance of the coil 2 which will produce just enough regenerative coupling at the junction 102 to cause the triode 91 to oscillate during the first half cycles of the supply voltage. Similarly, the control point reactance value for the triode 92 is that value of the reactance of the coil 2 which causes just enough regenerative coupling to be obtained from the junction 109 to cause oscillation to the triode 92 during the second halves of the supply voltage cycles. Since the circuit portion 93 is operatively energized only during said first half cycles, while the circuit portion 94 is operatively energized only during said second half cycles, the relay 14 will be controlled solely in accordance with the state of oscillation of the triode 91 which in turn will be determined by whether the adjusted reactance value of the coil 2 is above or below the corresponding control point value as defined above, while the relay 20 will be controlled solely in accordance with the state of oscillation of the triode 92 which in turn will be determined by whether the adjusted reactance value of the coil 2 is above or below the control point value individual to the triode 92. Taking into account the foregoing assumption as to the relative values of the components of the circuit, it will be seen that movement of the vane 1 toward the coil 2 will progressively reduce the adjusted reactance value of the latter, and hence will first cause the triode 91 to stop oscillating and to actuate the relay 14 into the picked-up position, whereafter the continued reduction of the adjusted reactance value of the coil 2 will subsequently stop the oscillation of the triode 92 and will cause the relay 20 to be actuated into the picked-up position.

*The diagrams of Figs. 12 and 13*

In Figs. 12 and 13, I have shown diagrams relating to the several control effects which the apparatus of Fig. 10 is operative to produce in the presence of various adjusted reactance values of the coil 2 corresponding to various positions of the vane 1. Fig. 12 illustrates an advantageous manner of interconnecting the contacts of the relays 14 and 20 so that each of the three control effects produced by the apparatus will connect a respectively different one of three terminals to a supply terminal, while Fig. 13 illustrates the various connections established by the Fig. 10 apparatus, when interconnected as shown in Fig. 12, for various positions of the vane 1 and adjusted reactance values of the coil 2 which establish the several control effects. The connections shown in Fig. 13 corresponding to each of the three control effects are limited in each case to the circuit of the particular one of the terminals 113 through 115 which is energized by the corresponding control effect.

As shown in Fig. 12, a common terminal 110 is connected by a conductor to a supply terminal 111. A second supply terminal 112 is selectively connected by the relays 14 and 20 to one or another of a first control effect terminal 113, a second control effect terminal 114, and a third control effect terminal 115. To this end, the terminal 113 is connected by a conductor to the normally-closed contact 18 of the relay 14, while the movable contact 17 of the latter is connected by a conductor to the supply terminal 112. The terminal 114 is connected by a conductor to the normally-closed contact 24 of the relay 20, while the movable contact 23 of the latter is connected by a conductor to the normally-open contact 19 of the relay 14. Finally, the contact 115 is connected by a conductor to the normally-open contact 25 of the relay 20. The relays 14 and 20 are shown in the dropped-out position in Fig. 12.

The various vane positions and reactance values for the coil 2 which produce the several control effects, the positions of the relays 14 and 20 corresponding to these control effects, and the particular terminals energized by the establishment of the different control effects will now be described with reference to Fig. 13. When said reactance value is above the first or higher control point value, the first control effect is established, wherein each of the relays 14 and 20 is in the dropped-out position, whereby solely the terminal 113 is connected to the supply terminal 112. This connection is established by the engagement of the contacts 17 and 18 as shown. When said reactance has a value which lies between the first and second control point values, and hence is in the neutral zone, the second control effect is established, with the relay 14 in the picked-up position and the relay 20 in the dropped-out position as before. This results in the connection of solely the terminal 114 to the supply terminal 112, this connection existing by virtue of the engagement of the contacts 17 and 19, and the contacts 23 and 24. When said reactance has a value which is below the second or lower control point value, the third control effect will be established by both of the relays 14 and 20 being in the picked-up position simultaneously. This causes solely the terminal 115 to be connected to the supply terminal 112, this connection existing by virtue of the engagement of the contacts 17 and 19 and the engagement of the contacts 23 and 25.

*Operation of the Fig. 10 apparatus*

With reference to Figs. 10 through 13, let it be assumed for purposes of providing a specific operative illustration that the vane 1 is progressively moved from a position remote from the coil 2 to a position well within the space between the halves of the coil, and is then moved back to the initial position. The various control effects produced as such motion of the vane takes place will now be described.

When the vane 1 is sufficiently out from between the halves of the coil 2 so that the coupling produced by the circuit 5' is higher than that required to produce oscillation of both of the triodes 91 and 92, the latter will be in oscillation, and both of the relays 14 and 20 will be in the dropped-out position. Therefore, as seen from Fig. 13, the adjusted reactance of the coil 2 will be higher than either of the first, or higher, and second, or lower, control point values, and the first control effect will be established. Accordingly, the terminal 113 alone will be connected to the supply terminal 112 through the normally-closed relay contacts 17 and 18 of the relay 14.

When the vane 1 is moved into the spaced between the halves of the coil 2 to a point where the coupling of the circuit 5' is just reduced below the value required to maintain the oscillation of the triode 91, the adjusted value of the reactance of the coil 2 will have been decreased below the first or higher of the two control point values, whereby oscillation of the triode 91 will be prevented during the first halves of the supply voltage cycles. Since under no condition can the triode 91 oscillate during the second half cycles, oscillation of the triode 91 will be completely prevented, whereby the conductivity thereof during the first half cycles will be increased sufficiently to cause the relay 14 to be actuated into the picked-up position.

Since it is assumed that the new position of the vane, at which the coupling with respect to the triode 91 is reduced below the minimum oscillatory value, is not effective to reduce the coupling with respect to the triode 92 sufficiently to interrupt the oscillation thereof, the relay 20 will remain in the dropped-out position, whereby the second control effect will be established. Under this effect, the terminal 114 alone will be connected to the supply terminal 112, since the movable contact 17 of the relay 14 will engage the normally-open contact 19 which is connected to the movable contact 23 of the relay 20, and since the last mentioned contact will be in engagement with the normally-closed contact 24 which is connected to the terminal 114.

Further movement of the vane 1 into the space between the halves of the coil 2 will further decrease the adjusted reactance value of the coil 2 and the coupling provided by the circuit 5'. Since the reactance of the coil 2 will have already been reduced below the higher control point value individual to the triode 91 and below which this triode cannot oscillate, the relay 14 will remain in the picked-up position. However, the vane 1 will eventually reach a position where the coupling will be reduced below the value necessary to maintain the triode 92 in oscillation. In other words, the adjusted reactance value of the coil 2 will eventually be reduced below the second or lower control point value, whereby the oscillation of the triode 92 will cease, and its conductivity will be increased during its operative half cycles. This will result in the actuation of the relay 20 into the picked-up position and the establishment of the third control effect, wherein both of the relays 14 and 20 are simultaneously maintained in the picked-up position. The establishment of the third control effect will cause the terminal 115 alone to be connected to the supply terminal 112, since the movable contact 17 of the relay 14 will still engage the normally-open contact 19 which is connected to the movable contact 23 of the relay 20, and since the latter will be held in engagement with the normally-open contact 25 connected to the terminal 115.

If the vane 1 is now moved in a direction away from the coil 2, the reactance of the latter will be progressively increased, whereby the triode 92 will go into oscillation and the relay 20 will move to the dropped-out position as said reactance is increased above the lower control point reactance value. Accordingly, the apparatus will then be actuated from the third control effect to the second control effect, and the connection of the supply terminal 112 will be shifted from the terminal 115 to the terminal 114. Further withdrawal of the vane 1 from between the halves of the coil 2 will subsequently cause the adjusted reactance value thereof to be increased past the high control point value, at which value the oscillation of the triode 91 will be permitted. Therefore, the apparatus will then be actuated from the second control effect into the first control effect, since both of the relays 14 and 20 will have been actuated into the dropped-out position. This will transfer the connection of the supply terminal 112 from the terminal 114 to the terminal 113.

Summarizing the foregoing, the circuit 5' in combination with the inductor 105 provides regenerative coupling for each of the triodes 91 and 92. For any given position of the vane 1 relative to the coil 2, a higher value of coupling will be provided for the triode 92 than will be provided for the triode 91. Accordingly a different control point reactance value is established for each of the triodes 91 and 92 on one or the other side of which value the oscillation of the corresponding triode is respectively permitted and prevented. Since each of the triodes 91 and 92 is operatively energized solely during the half cycles of the supply voltage which alternate with those in which solely the other triode is operatively energized, the resulting actuation of each of the relays 14 and 20 is solely controlled with respect to the corresponding control point value, and is such as to provide the three distinct control effects enumerated and described above.

The inductor 105 is advantageously made adjustable, as shown, for the purpose of providing means by which the width of the neutral zone can be adjusted. It should be apparent from the foregoing description that the value of the inductance of the inductor 105 determines the difference between the coupling magnitudes produced at the junctions 102 and 109 for any given reactance value of the coil 2, and hence determines the difference between the aforementioned first and second values of the reactance control point. Increases and decreases effected in the inductance value of the inductor 105 will cause the second control point value to be respectively moved to the right and to the left in Fig. 13.

By way of illustration and example, and not by way of limitation, it is noted that a working model of the Fig. 10 apparatus employed the following values for the components of the apparatus:

| | | |
|---|---|---|
| Resistor 101 | K. ohms | 470 |
| Condenser 30 | mmf | 25 |
| Condenser 31 | mmf | 10 |
| Condenser 39 | mf | 10 |
| Condenser 40 | mf | 10 |
| Condenser 98 | mmf | 5000 |
| Condenser 100 | mmf | 5000 |
| Condenser 104 | mmf | 5000 |
| Condenser 106 | mmf | 10 |
| Condenser 107 | mf | 1.0 |
| Inductor 105 | microhenries | 2–6 |
| Coil 2 | do | 0.5–1.0 |
| Coil 28 | do | 2.0 |
| Coil 29 | do | 2.0 |
| Coupling 28–29 | do | 0.5 |
| Relay winding 16 | ohms | 5000 |
| Relay winding 22 | do | 5000 |
| Trans. winding 9' | volts | 220 |
| Choke coil 37 | millihenries | 1.5 |
| Tube 91 | | ½ 12AU7 |
| Tube 92 | | ½ 12AU7 |
| Supply voltage frequency | cps | 60 |

*The apparatus of Fig. 14*

In Fig. 14 there is illustrated a preferred modification of the apparatus of Fig. 10 which includes a desirable safe-failure portion 116 not included in the Fig. 10 arrangement. Aside from the safe-failure portion, the apparatus of Fig. 14 is substantially identical to that of Fig. 10. It is to be noted, however, that the safe-failure aspects and arrangements per se are not a part of the present invention, but are the invention of Robert J. Ehret and Warren Moore, Jr., and are disclosed and claimed in a copending application filed on even date herewith and now issued as Patent No. 2,653,279 of September 22, 1953.

It is well known in the art that there are certain automatic control applications which render it necessary or at least desirable to provide the control apparatus with so-called safe-failure provisions. Such provisions operate to prevent failure of some portion of the control apparatus from establishing an unsafe condition of operation or control. As an example, when the vane 1 of any of the apparatus embodiments disclosed herein is adapted to be positioned by the pointer of a galvanometer or millivoltmeter type of responsive instrument which positions the vane in accordance with a measured temperature, and when the relays 14 and 20 control the heating of the means to the temperature of which the millivoltmeter is responsive, it is usually desirable, and in some instances necessary, to assure that the heat is not supplied in error, due to the failure of some component of the control apparatus to respond properly to the measured temperature.

With specific reference to the arrangement disclosed in Figs. 10 through 13, which arrangement is not equipped with the safe-failure provision of Fig. 14, it can be seen that any component failure within the apparatus which permits both of the relays 14 and 20 to be simultaneously actuated into the dropped-out position will cause the establishment of the first control effect, and the resultant energization of the terminal 113 from the supply terminal 112. If the vane 1 of the apparatus of Fig. 10 were positioned by a millivoltmeter responsive to the temperature controlled by the relays of the apparatus, the vane positions corresponding to the first control effect would conventionally be representative of low values of the measured and controlled temperature, or at least of values below the desired value of temperature. Therefore, in the operation of the apparatus of Fig. 10 under the foregoing assumptions, the terminal 113 would normally be energized when the controlled temperature was below the desired value, whereby the first control effect would be one in which the energization of the terminal 113 would cause heat to be supplied at a maximum rate. From this it should be obvious that a failure which would cause the first control effect to be established irrespective of the value of the controlled temperature and of the position of the vane 1 would result in the continuous supply of heat at the maximum rate, thereby producing what could well be a highly unsafe condition.

It is for the purpose of preventing the apparatus of Fig. 14 from establishing such unsafe conditions that the safe-failure portion 116 is included in the Fig. 14 apparatus. The portion 116 includes triode electron tubes 117 and 118 and various other circuit components and connections to be described below. Each of the triodes 117 and 118 includes the usual anode, control grid, cathode, and cathode heater elements.

The Fig. 14 arrangement also includes the triodes 91 and 92, the common coupling circuit portion 5', the adjustable inductor 105 and the condenser 106, the condensers 98 and 107, the rectifiers 88 and 89, the circuit portion 93, the junction 90, and the connections between these components, all as in Fig. 10. In Fig. 14, however, the transformer 6B of Fig. 10 is replaced by a transformer 6C having the same windings 7 and 9' which are included in the transformer 6B but having a center-tapped winding 8" in lieu of the winding 8 of the transformer 6B. The winding 8" has a center-tap connection 119 and terminals 26" and 27", and is connected to the cathode heaters of the several electron tubes of the apparatus for energizing the latter in a manner to be described hereinafter. It is assumed that the terminal 26" is positive with respect to the terminal 27" and the connection 119 during the first half cycles of the alternating voltage supplied by the conductors 46 and 47, during which the terminal 34' is positive with respect to the junction 90 and the terminal 36'. It is also assumed that the terminal 27" is positive with respect to the terminal 26" and the connection 119 throughout the second half cycles of the supply voltage, during which the terminal 36' is positive with respect to the terminal 34' and the connection 90.

In Fig. 14, the previously described relays 14 and 20 are replaced by respective relays 14' and 20', each of which includes all of the parts of the corresponding former relay, and in addition includes a second set of normally-open and normally-closed contacts. Specifically, the relay 14' includes the winding 16, the movable contact 17, the normally-closed contact 18, and the normally-open contact 19, and in addition includes a movable contact 120, a normally-closed contact 121, and a normally-open contact 122. Similarly, the relay 20' includes the winding 22, the movable contact 23, the normally-closed contact 24, and the normally-open contact 25, and in addition includes a movable contact 123, a normally-closed contact 124, and a normally-open contact 125. The contacts 120 through 125 are provided for the advantageous actuation of signalling means as will be brought out in the description of Figs. 15 and 16 to be made hereinafter. The by-pass condensers 39 and 40 are connected in parallel with the respective relay windings 16 and 22 in Fig. 14 as in the previous arrangements.

For the purpose of illustrating the safe-failure aspects of the Fig. 14 apparatus to best advantage, there has been shown a galvanometer or millivoltmeter type of measuring instrument 126 which is assumed to be the means which positions the vane 1 in the Fig. 14 apparatus. To this end, the pointer 127 of the millivoltmeter 126 is adapted to adjust the vane 1 relative to the coil 2 by means of a suitable mechanical linkage diagrammatically illustrated at 128. Also for purposes of illustration, the instrument 126 is shown as being connected to a thermocouple 129 so as to be responsive to the output voltage thereof, whereby the position of the vane 1, and hence the adjusted reactance value of the coil 2, are assumed to be proportional to the temperature measured by the thermocouple 129 and the instrument 126. It is also assumed that the temperature to which the thermocouple 129 is subjected is controlled by heating means which in turn are controlled by the conjoint action of the relays 14' and 20', connected as shown in Figs. 15 and 16.

The circuit 5' of Fig. 14 is coupled to the two triodes 91 and 92 as a common oscillation-controlling circuit as in the Fig. 10 arrangement, and the oscillation of the triodes is controlled exactly as described in connection with that arrangement. Further, the relay 14' in the portion 93 is controlled by the state of oscillation of the triode 91 with reference to the first, higher control point value in the same manner as the relay 14 of Fig. 10 is so controlled. Also, the relay 20' is controlled by the state of oscillation of the triode 92 in the Fig. 14 apparatus, but not in the same manner as the relay 20 is controlled by that triode in Fig. 10. Instead, the relay 20' is controlled by the state of oscillation of the triode 92 through the medium of the safe-failure portion 116 as will become apparent, this control being such as to cause the relay 20' to assume the picked-up position at all times in which the triode 92 is oscillating, and to assume the dropped-out position whenever the oscillation of the triode 92 is prevented.

To this end, the relay 20' is not included in the load circuit of the triode 92, but this load circuit instead includes the conductor 97 connecting a load resistor 37' between the terminal 36' and the anode of the triode 92.

The relay 20' is included in the output or load portion of the portion 116, and the input portion of the latter is coupled across the coil 29. Specifically, the relay 20' is connected in the output or load circuit of the triode 118, while the input circuit of this triode is controlled by a D. C. bias voltage developed by the tube 117 from the oscillation signal which is produced across the coil 29 when either of the triodes 91 and 92 is oscillating. The manner in which the position of the relay 20' is controlled solely in accordance with the state of oscillation of the triode 92 will be explained hereinafter.

In accordance with the above, the anode of the tube 117 is connected to the cathode or lower end of the coil 29 by a conductor 130. The control grid of the tube 117 is connected to the anode thereof for operation of the tube 117 as a diode. The cathode of the tube 117 is connected through a condenser 131 and a conductor 132 to the transformer winding terminal 26″, and is connected from there through a conductor 133 to the negative junction 90. The latter is connected by the conductor 38 to the junction 99 at the upper end of the coil 29 as before. Hence, when either of the triodes 91 and 92 is in oscillation, the tube 117 will develop a bias voltage across the condenser 131 which renders the cathode of the tube 117 positive with respect to the terminal 26″. The path of the signal which produces this bias voltage can be traced from the lower, cathode end of the coil 29 through the conductor 130, the tube 117, the condenser 131 and the conductors 132, 133, and 38 to the upper end of the coil 29 at the junction 99.

The input circuit of the triode 118 is connected across the condenser 131 in series with a source of A. C. bias voltage. Specifically, the control grid of the triode 118 is connected through a resistor 134 to the cathode of the tube 117 and hence to the left-hand terminal of the condenser 131. The cathode of the triode 118 is connected by a conductor 135 to the terminal 27″ of the winding 8″, through the latter to the terminal 26″, and from there through the conductor 132 to the right-hand terminal of the condenser 131.

As was mentioned above, the relay 20′ is connected in the load circuit of the triode 118, and to this end the relay winding 22 is connected between the anode of the triode 118 and the transformer winding terminal 36′ by a conductor 136. Thus the relay 20′ is connected in a portion 94′ which is analogous to the portion 94 of the Fig. 10 arrangement.

The load circuit of the triode 118 can be traced from the terminal 36′ through the winding 22 and the conductor 136 to the anode of the triode 118, and from the cathode of the latter through the conductor 135 and the winding 8″ to the negative junction 90. It is noted that the instantaneous polarities of the transformer windings are such that the A. C. bias voltage of the winding 8″ biases the cathode of the triode 118 positively with respect to the associated control grid during the second half cycles of the supply voltage, which are the operative half cycles for the triode 118.

The specific manner in which the relay 20′ is controlled by the state of oscillation of solely the triode 92 will now be described. Whenever the triode 92 is in oscillation, a positive grid-cathode bias voltage for the triode 118 is developed across the condenser 131. This bias voltage is made to have such a value as to overcome the negative grid-cathode bias voltage produced by the winding 8″ during the operative half cycles for the triodes 92 and 118, whereby the conductivity of the triode 118 is made sufficiently high to operatively energize the relay 20′ and hence to cause the latter to assume the picked-up position. The fact that the triode 91 may sometimes be oscillating during the alternate half cycles is of no consequence in connection with the operation of the relay 20′, since the triode 92 will always be oscillating during its operative half cycles at any time in which the triode 91 can possibly be oscillating during its operative half cycles. In other words, the triode 91 can never be oscillating during its operative half cycles unless the triode 92 is already oscillating during its operative half cycles. That this is true will be readily apparent when it is remembered that the movement of the vane 1 towards the coil 2 always terminates the oscillation of the triode 91 before terminating the oscillation of the triode 92.

When the oscillation of the triode 92 is prevented during the operative half cycles of that triode, due to movement of the vane 1 to a position which is past the lower reactance control point value, all oscillation of the circuit will cease, since the oscillation of the triode 91 must have been terminated previously as noted above. Accordingly, the positive bias voltage developed across the condenser 131 will disappear, and the bias voltage supplied by the winding 8″ will drive the control grid of the triode 118 negative with respect to the associated cathode during the second half cycles of the supply voltage, which are the only half cycles in which the triode 118 can be conductive. Therefore, the conductivity of the triode 118 will be signficantly reduced below the value corresponding to oscillation of the triode 92, whereby the relay 20′ will no longer be operatively energized, but will assume the dropped-out position.

From the above it can be seen that the relay 20′ is maintained in the picked-up position at all times in which the triode 92 is in the oscillating state, and is maintained in the dropped-out position whenever the vane 1 prevents the triode 92 from oscillating. This relationship between the state of oscillation of the triode 92 and the position of the relay 20′ is seen to be the exact reverse of the relationship existing between the position of the relay 20 and the state of oscillation of the triode 92 in the Fig. 10 arrangement. This fact is basically responsible for the safe-failure operation of the Fig. 14 apparatus, as will be brought out hereinafter.

To summarize the relationships between the oscillatory states of the triodes 91 and 92 and the positions of the relays and the several control effects produced thereby, it is noted that an adjusted reactance value for the coil 2 above the first, higher control point value permits both of the triodes 91 and 92 to oscillate, thereby causing the relay 14′ to be in the dropped-out position and the relay 20′ to be in the picked-up position. This is the first control effect for the Fig. 14 apparatus. It will become apparent from the subsequent description that the safe-failure operation provided by the apparatus stems basically from the requirement that the relay 20′ be in the picked-up position in order to establish the first control effect.

When said reactance value is reduced below the first control point value, but is still above the second, lower control point value, the oscillation of the triode 91 will be prevented at all times, but the oscillation of the triode 92 will still be permitted. This will cause the relay 14′ to assume the picked-up position, thereby establishing the second control effect for the apparatus wherein both of the relays 14′ and 20′ are simultaneously maintained in the picked-up position.

When said reactance value is subsequently reduced below the second, lower control point value, the oscillation of the triode 92 will also be prevented at all times, and the relay 20′ will therefore be actuated into the dropped-out position. This will establish the third control effect of the apparatus, wherein the relay 14′ is in the picked-up position while the relay 20′ is in the dropped-out position.

*The diagrams of Figs. 15 and 16*

Figs. 15 and 16 are diagrams relating to the several control effects which the apparatus of Fig. 14 is operative to produce in the presence of various adjusted reactance values of the coil 2 corresponding to various positions of the vane 1. Fig. 15 illustrates an advantageous manner of interconnecting the contacts of the relays 14′ and 20′ so that each of the three control effects produced by the apparatus will connect a respectively different one of the three terminals 113, 114, and 115 to the supply terminal 112, and will cause the appropriate actuation of signal lamps 137 and 138. Fig. 16 illustrates the various connections established by the Fig. 14 apparatus, when interconnected as shown in Fig. 15, for various positions of the vane 1 and corresponding adjusted reactance values of the coil 2 which produce the several control effects. The connections shown in Fig. 16 corresponding to each of the three control effects are limited in each case to the circuit of the particular one of the terminals 113 through 115 which is energized by the corresponding control effect.

As shown in Fig. 15, the supply terminal 111 is connected directly to the common terminal 110, while the other supply terminal 112 is connected to a conductor 139 to the movable contact 23 of the relay 20'. The first control effect terminal 113 is connected directly to the normally-closed contact 18 of the relay 14', and the movable contact 17 of the latter is connected by a conductor 140 to the normally-open contact 25 of the relay 20'. The second control effect terminal 114 is connected directly to the normally-open contact 19 of the relay 14', and the third control effect terminal 115 is directly connected to the normally-closed contact 24 of the relay 20'. The relays 14' and 20' are shown in the dropped-out position of Fig. 15.

For the purpose of providing visual signals or indications as to which of the three control effects is established by the apparatus at any given time, the lamps 137 and 138 are interconnected with the remaining contacts of the relays 14' and 20' and the terminals 34' and 36' of the transformer secondary winding 9' of Fig. 14. Thus, a conductor 141 connects the terminal 34' to one terminal of the lamp 137, while the other terminal of the latter is connected to one terminal of the lamp 138 at a junction 142. The other terminal of the lamp 138 is connected through a current-limiting resistor 143 and a conductor 144 to the terminal 36'.

The conductor 141 is also connected to the movable contact 120 of the relay 14', while the terminal of the lamp 138 which is connected to the resistor 143 is also connected to the normally-closed contact 124 of the relay 20'. A conductor 145 connects the normally-closed contact 121 of the relay 14' to the normally-open contact 125 of the relay 20', and a conductor 146 connects the junction 142 to the movable contact 123 of the relay 20'.

The various vane positions and reactance values for the coil 2 which produce the several control effects, the positions of the relays 14' and 20' corresponding to these control effects, and the manner in which the particular one of the terminals 113 through 115 is energized for each of the control effects will now be described with reference to Fig. 16. When said reactance value is above the first or higher control point value, the first control effect is established, wherein the relay 14' is in the dropped-out position and the relay 20' is in the picked-up position. Under this condition, the terminal 113 alone is connected to the supply terminal 112, through a circuit which can be traced from the supply terminal 112 through the engaged contacts 23 and 25 of the relay 20' and through the engaged contacts 17 and 18 of the relay 14' to the terminal 113. When said reactance has a value which lies between the first and second control point values, and hence is in the neutral zone, the second control effect is established, with the relay 20' in the picked-up position as before and with the relay 14' also in the picked-up position. Under this condition, the terminal 114 alone is connected to the supply terminal 112, through a circuit which can be traced from the terminal 112 through the engaged contacts 23 and 25 of the relay 20' and through the engaged contacts 17 and 19 of the relay 14' to the terminal 114.

When said reactance has a value which is below the second or lower control point value, the third control effect is established, wherein the relay 14' remains in the picked-up position and the relay 20' assumes the dropped-out position. Under this condition, the terminal 115 alone is connected to the supply terminal 112, through a circuit which can be traced from the terminal 112 through the engaged contacts 23 and 24 of the relay 20' to the terminal 115.

When the first control effect is established, this fact is evidenced by the illumination of solely the signal lamp 138. The circuit producing this action can be traced from the terminal 34' through the engaged contacts 120 and 121 of the relay 14', through the engaged contacts 123 and 125 of the relay 20', and through the lamp 138 to the terminal 36'. When the second control effect is established, this fact is evidenced by the illumination of both of the lamps 137 and 138. The circuit producing this action can be traced from the terminal 34' directly through the lamps 137 and 138 in series to the terminal 36'. Finally, when the third control effect is established, solely the lamp 137 will be illuminated. The circuit for this action can be traced from the terminal 34' through the lamp 137 and through the engaged contacts 123 and 124 of the relay 20' to the terminal 36'.

*Operation of the Fig. 14 apparatus*

With reference to Figs. 14 through 16, let it be assumed for purposes of providing a specific operative illustration of the Fig. 14 apparatus under normal conditions that the vane 1 is moved to various positions relative to the coil 2. Specifically, let it be assumed that this movement of the vane 1 is effected by the instrument 126 in response to the temperature of the thermocouple 129, and that this temperature is that of a space to which heat is supplied by means energized in accordance with the operation of the relays 14' and 20' and the establishment of the three aforementioned control effects. In this connection, let it be assumed that the energization of the first control effect terminal 113 causes heat to be supplied to the space at a maximum rate, that the energization of the second control effect terminal 114 causes heat to be supplied to the space at an intermediate rate, and that the energization of the third control effect terminal 115 causes heat to be applied to the space at a minimum rate.

Let it also be assumed that the desired temperature of the space causes the vane 1 to adjust the reactance of the coil 2 to a value within the neutral zone, and that temperatures respectively above and below this desired value cause the vane to adjust the reactance value of the coil 2 to values which are respectively below and above the value corresponding to the desired value of temperature. This means that an increase in the temperature of the thermocouple 129 will cause the adjusted reactance value of the coil 2 to decrease or move toward the right in Fig. 16. The last mentioned temperature will hereafter be referred to as the measured temperature.

Finally, let it be assumed that the minimum, third control effect rate of heat supply is insufficient to maintain the space temperature at the desired value, and is insufficient to produce an unsafe condition, no matter how long it is in effect.

When the measured temperature is considerably below the desired value, due for example, to the supply of heat having been previously interrupted, the vane 1 will be remote from the coil 2, and the adjusted reactance value of the coil will be well above the first, higher control point value. Accordingly, both of the triodes 91 and 92 will be oscillating, the relay 14' will be in the dropped-out position, the triode 118 will be conductive, and the relay 20' will be in the picked-up position. Therefore, the first control effect will be established, the terminal 113 will be energized, the lamp 138 alone will be illuminated, and heat will be supplied to the aforementioned space at a maximum rate.

As the measured temperature increases, in the presence of the supply of heat, the vane 1 will move closer to the coil 2, and the adjusted reactance value of the coil will eventually be reduced below the first control point value. Accordingly, the triode 91 will stop oscillating, and the relay 14' will be actuated into the picked-up position. Since the oscillation of the triode 92 will not be terminated, the relay 20' will remain in the picked-up position. Therefore, the second control effect will be established, the terminal 114 will be energized, both of the lamps 137 and 138 will be illuminated, and the rate of supply of heat will be reduced to the intermediate value.

If the measured temperature still continues to increase, the vane 1 will move further within the space between the halves of the coil 2, and the adjusted reactance value of the coil will eventually be reduced below the second, lower control point value. Accordingly, the triode 92 will stop oscillating, the triode 118 will be rendered substantially less conductive, and the relay 20' will be actuated into the dropped-out position. Since the relay 14' will remain in the picked-up position, the third control effect will be established, the terminal 115 will be energized, the lamp 137 alone will be illuminated, and the rate of supply of heat will be reduced to the minimum value.

Since it has been assumed that this minimum rate of heat supply is insufficient to hold the measured temperature above the desired value, the temperature will eventually decrease, and the adjusted reactance value of the coil 2 will be increased above the second control point value. This will cause the triode 92 to oscillate, and will hence cause the triode 118 to increase its conductivity and actuate the relay 20' into the picked-up position, thereby shifting the apparatus from the third to the second control effect. If the resulting intermediate rate of heat supply is sufficient to maintain the measured temperature at the desired value, the second control effect will be maintained.

If the measured temperature continues to decrease, however, due to any of the usual causes, the adjusted reactance of the coil 2 will subsequently be increased above the first control point value, whereby the triode 91 will be permitted to oscillate. Accordingly, the relay 14' will then be actuated to the dropped-out position, the first control effect will be established, and the rate of heat supply will be increased to the maximum value. Under normal conditions, the measured temperature will usually be held close to the desired value, in the absence of serious disturbing occurrences, since the width of the neutral zone in actual practice is made desirably small by the proper adjustment of the inductor 105.

Safe-failure operation

As noted above, the foregoing description concerns the normal operation of the Fig. 14 apparatus. The following description, however, will deal with operation under abnormal conditions which tend to establish unsafe effects, and will be made for the purpose of illustrating the operation of the safe-failure provisions of the apparatus. However, since there are numerous conditions of failure which could occur, it is impractical, from the standpoint of space, to attempt to discuss all of such possible failures herein. Therefore, only two or three of such possible failures, and the operation of the apparatus in the presence thereof, will be included in the following discussion.

Broadly, any failure of the apparatus which causes the relay 20' to assume the dropped-out position may be termed a safe failure, since no unsafe operating condition will be produced by such failure. This can clearly be seen from Fig. 15, wherefrom it is apparent that only the minimum heat supply rate terminal can be energized when the relay 20' is in the dropped-out position as shown. Since there is no connection under this condition between the supply terminal 112 and the contacts of the relay 14', it is immaterial, from the safe-failure standpoint, whether the relay 14' is picked-up or dropped-out at that time.

Before mentioning several apparatus failures which could occur and which would cause the apparatus to fail safely, it should be noted with reference to Fig. 14 that the cathode heaters of the triodes 91 and 92 are connected in series across the transformer winding 8'' between the terminals 26'' and 27''. Likewise, the cathode heaters of the tubes 117 and 118 are connected in series between the terminals 26'' and 27'''. Accordingly, the open-circuiting of the cathode heater of either of the triodes 91 and 92 positively renders both of these triodes inoperative, while open-circuiting of the cathode heater of either of the tubes 117 and 118 positively renders both of these tubes inoperative. In view of the above, it can be seen that cathode heater or equivalent failure in either of the triodes 91 and 92 is a safe failure, since no oscillation will then be possible in the apparatus, and the triode 118 will therefore be incapable of actuating the relay 20' out of the dropped-out or safe position. Likewise, cathode heater or equivalent failure in either of the tubes 117 and 118 is a safe failure, since the triode 118 will be rendered incapable of actuating the relay 20' out of the dropped-out position under this condition.

Further, any failure which prevents oscillation within the apparatus will result in the triode 118 being prevented from actuating the relay 20' out of the dropped-out position, and hence will not produce an unsafe condition.

Finally, it can be seen that the failure of the supply of energizing current which energizes the transformer 6C will only prevent the relay 20' from being energized, and will therefore leave that relay in the safe position.

It is apparent from the foregoing that the safe-failure operation of the Fig. 14 apparatus stems basically from the requirement that the relay 20' be picked-up in order that heat be supplied at the maximum rate.

In order to provide the so-called "thermocouple burnout" protection often required in apparatus of the millivoltmeter controller type, the apparatus of Fig. 14 advantageously includes a resistor 147 and a rectifier 148 connected in series between one of the conductors of the thermocouple 129 and the center-tap connection 119 of the winding 8'', and also includes a conductor 149 which connects the other thermocouple conductor to the terminal 26'' of the winding 8''. The operation of the resulting arrangement is such that open-circuiting of the thermocouple circuit causes a bias voltage to be applied to the instrument 126 of such a nature that the vane 1 is maintained well within the space between the halves of the coil 2. This obviously causes the third control effect to be established and maintained in the apparatus, and thereby prevents the failure of the thermocouple circuit from causing an unsafe condition to be produced.

By way of illustration and example, and not by way of limitation, it is noted that a working model of the apparatus of Figs. 14 through 16 employed the following values for the components of the apparatus:

| | | |
|---|---|---|
| Resistor 37' | K. ohms | 18 |
| Resistor 101 | do | 470 |
| Resistor 134 | megohms | 2.2 |
| Resistor 143 | K. ohms | 160 |
| Condenser 30 | mmf | 25 |
| Condenser 31 | mmf | 10 |
| Condenser 39 | mf | 10 |
| Condenser 40 | mf | 10 |
| Condenser 98 | mmf | 5000 |
| Condenser 100 | mmf | 5000 |
| Condenser 104 | mmf | 5000 |
| Condenser 106 | mmf | 10 |
| Condenser 107 | mf | 1.0 |
| Condenser 131 | mmf | 5100 |
| Inductor 105 | microhenries | 2–6 |
| Coil 2 | do | 0.5–1.0 |
| Coil 28 | do | 2.0 |
| Coil 29 | do | 2.0 |
| Coupling 28–29 | do | —0.5 |
| Relay winding 16 | ohms | 5000 |
| Relay winding 22 | do | 5000 |
| Trans. winding 9' | volts | 220 |
| Trans. winding 8'' | do | 12.6 |
| Tube 91 | | ½ 12AU7 |
| Tube 92 | | ½ 12AU7 |
| Tube 117 | | ½ 12AU7 |
| Tube 118 | | ½ 12AU7 |
| Supply voltage frequency | cps | 60 |

While, in accordance with the provisions of the statutes, I have illustrated and described the best form of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention, what I claim as new and desire to secure by Letters Patent is as follows:

1. Control apparatus, comprising a controlled circuit including a single adjustable impedance element adapted to be adjusted to various values, said circuit being actuatable into one or another condition depending upon the relationship between the adjusted value to which said element is adjusted and a control point value, first means connected to said element and operative effectively to shift the value of said element and hence said control point value between two predetermined values alternately during periods which alternate at a predetermined frequency, first and second responsive portions connected to said circuit and responsive to the condition thereof, and second means connected to said portions and operative to cause one of said portions to respond to the condition of said circuit solely during the periods in which said control point has one of said two values, and to cause the other of said portions to respond to said condition solely during the alternate periods in which said control point has the other of said two values.

2. Control apparatus, comprising first and second responsive devices, first means connected to said devices and operative to permit and prevent the operative energization of said first device in alternation, and to prevent and permit the operative energization of said second device throughout the times in which the operative energization of said first device is respectively permitted and prevented by said first means, a single adjustable impedance element connected in a circuit with both of said devices, and second means connected to said element and operative, whenever the operative energization of said first device is permitted by said first means, effectively to establish a first control point value of said element on one or the other side of which the operative energization of said first device is respectively effected and prevented, and operative, whenever the energization of said second device is permitted by said first means, effectively to establish a different control point value of said element on one or the other side of which the operative energization of said second device is respectively effected and prevented.

3. Apparatus as specified in claim 2, wherein said circuit includes an oscillator circuit which is operative at any given time to oscillate or not to oscillate when said element is adjusted to values respectively on one or the other side of the then existing value of said control point.

4. Control apparatus, comprising first and second electroresponsive devices, each of which is operative to assume one or another condition depending upon whether the device is or is not operatively energized, first means connected to said devices and operative to permit and prevent the operative energization of said first device in alternation at a predetermined frequency, and to prevent and to permit the operative energization of said second device throughout the times in which the operative energization of said first device is respectively permitted and prevented by said first means, a single adjustable impedance element connected in a circuit with both of said devices and operative, when adjusted to different values, to permit and prevent the operative energization of said devices, and second means electrically connected to said element and operative, whenever the operative energization of said first device is permitted by said first means, effectively to establish electrically a first control point value of said element on one or the other side of which the operative energization of said first device is respectively effected and prevented, and operative, whenever the energization of said second device is permitted by said first means, effectively to establish electrically a different control point value of said element on one or the other side of which the operative energization of said second device is respectively effected and prevented, said apparatus being thereby operative to cause a given change in the adjustment of said element through one of said first and different control point values to actuate one of said devices from one condition to the other without actuating the other of said devices from one condition to the other.

5. Control apparatus, comprising circuit means actuatable into first and second states and having first and second portions, a separate responsive device individual to each of said portions and operative to assume one or another condition depending upon the flow of current in the corresponding portion, a single adjustable impedance element included in said circuit means and operative, when adjusted to one value, to permit said circuit means to assume said first state, and operative, when adjusted to another value, to prevent said circuit means from assuming said first state, first means connected to said first and second portions, including terminal means adapted to be connected to a source of energizing current, and operative, when so connected, to energize solely one of said first and second portions during first periods which alternate with second periods during which solely the other of said first and second portions is energized, the flow of current in said first and second portions being jointly determined by the energization thereof and by the state of said circuit means, and being operative to have one or another value depending upon whether said circuit means is in said first or said second state, respectively, and second means electrically connected to said element and operative solely during said first periods effectively to establish a first control point value of said element on one or the other side of which said element respectively permits and prevents the assumption of said first state by said circuit means, and operative during solely said second periods effectively to change by a predetermined amount the value of said control point, said apparatus being thereby operative to cause a given change in the adjustment of said element to actuate one of said devices from one condition to the other without actuating the other of said devices from one condition to the other.

6. Control apparatus, comprising a single oscillator circuit having first and second circuit portions, a separate responsive device individual to each of said portions and operative to assume one or another condition depending upon the flow of current in the corresponding portion, a single adjustable impedance element included in said circuit and operative, when adjusted to one value, to permit oscillation of said circuit, and operative, when adjusted to another value, to prevent oscillation of said circuit, first means connected to said first and second portions, including terminal means adapted to be connected to a source of energizing current, and operative, when so connected, to energize solely one of said first and second portions during first periods which alternate with second periods during which solely the other of said first and second portions is energized, the flow of current in said first and second portions being jointly controlled by the energization thereof and by the state of oscillation of said circuit, and second means electrically connected to said element and operative solely during said first periods effectively to establish a first control point value for said element on one or the other side of which said element respectively permits and prevents oscillation of said circuit, and operative during solely said second periods effectively to change by a predetermined amount said control point value of said element, whereby a given change in the adjustment of said element is operative to actuate one of said devices from one condition to the other without actuating the other of said devices from one condition to the other.

7. Apparatus as specified in claim 6, wherein said element is a reactive element including a reactive part and a cooperating part, the latter being operative, when adjusted relative to said reactive part, to vary the reactance of said element.

8. Apparatus as specified in claim 7, wherein said second means includes an impedance element and is operative to connect the last mentioned impedance element in parallel with said reactive element solely during said second periods.

9. Apparatus as specified in claim 8, wherein said last mentioned impedance element is a resistor.

10. Apparatus as specified in claim 8, wherein said last mentioned impedance element is a condenser.

11. Apparatus as specified in claim 8, wherein said second means includes an electromagnetic switch having an operating portion and first and second contacts which are operative to engage and disengage each other alternately under the control of said operating portion, means adapted to energize said operating portion, and conductors operative to connect said last mentioned impedance element in series with said contacts across said reactive element.

12. Apparatus as specified in claim 7, wherein said second means includes an impedance, a rectifying device, conductors connecting said impedance and said rectifying device in series with each other and in parallel with said reactive element, and means operative to connect said rectifying device to a source of alternating voltage having a frequency which is equal to the frequency of alternation of said periods, and being operative, when so connected, to render said rectifying device alternately conductive and substantially non-conductive at the frequency of alternation of said periods, whereby said impedance is alternately effectively connected across and disconnected from said reactive element at said frequency.

13. Apparatus as specified in claim 12, wherein said rectifying device is a diode, and wherein the last mentioned means includes conductors adapted to apply an alternating voltage of said frequency across said diode.

14. Apparatus as specified in claim 7, wherein said second means includes an electron tube having an anode, a cathode, and a control grid, reactance means, means operative to connect said anode and cathode in series with said reactance means to a source of alternating voltage having a frequency which is equal to the frequency of alternation of said periods, means connecting said cathode to one terminal of said reactive element, means connecting said control grid to the other terminal of said reactive element, and means connecting said control grid to said anode, said second means being thereby operative to connect alternately different values of the input impedance of said triode across said reactive element.

15. Apparatus as specified in claim 6, wherein said oscillator circuit includes electron tube means having anode-cathode circuit portions, and wherein said first means includes conductor means connecting each of said responsive devices in series with a respective one of said anode-cathode circuit portions to said terminal means.

16. Apparatus as specified in claim 15, wherein said conductor means is adapted to connect one of said anode-cathode circuit portions to a source of alternating voltage which is displaced substantially 180 degrees in phase from a source of alternating voltage to which said conductor means is adapted to connect the other of said anode-cathode circuit portions.

17. Apparatus as specified in claim 6, wherein said first means includes conductor means operative to connect said first portion to a source of alternating voltage which is displaced substantially 180 degrees in phase from a source of alternating voltage to which said conductor means is operative to connect said second portion, wherein said element is a reactive element including a reactive part and a cooperating part, the latter being operative, when adjusted relative to said reactive part, to vary the reactance of said element, and wherein said second means includes an impedance element, an electromagnetic switch having an operating portion and first and second contacts, conductor means adapted to connect said operating portion to a source of alternating voltage of the same phase and frequency as the voltage of one of the first mentioned alternating voltage sources, said operating portion being operative, when so connected, to cause said contacts to engage and disengage each other at said frequency, and conductors operative to connect the last mentioned impedance element in series with said contacts across said reactive element.

18. Apparatus as specified in claim 6, wherein each of said portions includes an electron tube individual to that portion and having an input circuit and an output circuit including an anode and a cathode, wherein said first means includes connecting means adapted to connect one of said devices and the anode and cathode of the tube of the corresponding one of said portions in series to a first source of alternating voltage of said frequency, and adapted to connect the other of said devices and the anode and cathode of the tube of the other of said portions in series to a second source of alternating voltage of said frequency which is displaced substantially 180 degrees in phase from the voltage of said first source, wherein said element is connected in a feedback circuit between the input and output circuits of each of said tubes, and wherein said oscillator circuit includes means operative to increase substantially the conductivity of each of said tubes when said circuit is prevented from oscillating, by the adjustment of said element, during the ones of said periods in which the anode of that tube is rendered positive with respect to the cathode of that tube.

19. Apparatus as specified in claim 18, wherein said connecting means includes a transformer having a secondary winding provided with a center-tap connection and having a primary winding, and includes conductors connecting said primary winding to said terminal means, and wherein there are included conductor means connecting said center-tap connection to each of said cathodes, conductor means connecting one of said anodes through the corresponding one of said devices to one end terminal of said secondary winding, and conductor means connecting the other of said anodes through the other of said devices to the other end terminal of said secondary winding.

20. Apparatus as specified in claim 18, wherein said adjustable element is a reactive element including a reactive part and a cooperating part, the latter being adapted, when adjusted relative to said reactive part, to vary the reactance thereof, and wherein said second means includes an impedance, a control device, conductors connecting said impedance and said control device in series across said reactive element, and means adapted to energize said control device with alternating current of said frequency and of a phase which is substantially the same as that of the voltage of one of said first and second sources, said control device being operative, when so energized, to connect said impedance effectively across said reactive element throughout said second periods and to remove said impedance effectively from across said reactive element throughout said first periods.

21. Apparatus as specified in claim 18, wherein said adjustable element is a reactive element including a reactive part and a cooperating part, the latter being adapted, when adjusted relative to said reactive part, to vary the reactance of said element, wherein said element is connected in the oscillation determining portion of each of said circuit portions, wherein said second means includes an impedance device, and wherein said impedance device is connected with said element in solely one of said oscillation determining portions at all times.

22. Control apparatus, comprising an oscillator circuit having first and second circuit portions, each of which includes an electron tube having input, output, and load circuits, an adjustable inductive element connected within the input and output circuits of both of said tubes and adapted to permit or prevent the oscillation of said oscillator circuit accordingly as said element is adjusted to a value respectively above or below a control point value, first and second electro-responsive devices, conductors connecting one of said devices in series with the load circuit of one of said tubes to a first source of alternating current of a predetermined frequency, conductors connecting the other of said devices in series with the load circuit of the other of said tubes to a second source of alternating current of said frequency which is substantially 180 degrees out of phase with respect to said first source, an adjustable resistor, a switching device including a pair of contacts and operating means which are operative, when energized with alternating current, to open and close said contacts alternately at the frequency of the alternating energizing current, conductors connecting said operating means to one of said first and second sources, conductors connecting said contacts and said resistor in series across said element, thereby to establish two different values of said control point alternately at said frequency, and bias means included in said oscillator circuit and operative to cause said load circuits to effect the operative energization of each of said devices solely when the respective one of said portions is energized but is prevented from oscillating.

23. Control apparatus, comprising an oscillator circuit having first and second circuit portions, each of which includes an electron tube having input, output, and load circuits, an adjustable inductive element connected within the input and output circuits of one of said tubes and operative to permit or prevent the oscillation of the respective one of said portions accordingly as said element is adjusted to a value respectively above or below a first control point value, an impedance means connected in series with said element within the input and output circuits of the other of said tubes, said element being operative to permit or prevent the oscillation of the other of said portions accordingly as said element is adjusted to a value respectively above or below a second control point value which differs from said first control point value in accordance with the magnitude of the impedance of said impedance means, first and second electro-responsive devices, conductors connecting one of said devices in series with the load circuit of one of said tubes to a first source of alternating current of a predetermined frequency, conductors connecting the other of said devices in series with the load circuit of the other of said tubes to a second source of alternating current of said frequency which is substantially 180 degrees out of phase with respect to said first source, and bias means included in said oscillator circuit and operative to control the operative energization of each of said devices in accordance with the state of oscillation of the respective one of said portions.

24. Apparatus as specified in claim 23, wherein one of said devices includes means responsive to the oscillation of the respective one of said portions and operative to effect the operative energization of said one of said devices solely when the last mentioned one of said portions is oscillating, and wherein the other of said devices is operative to be operatively energized by the respective one of said load circuits solely when the respective one of said portions is energized but is prevented from oscillating.

25. Control apparatus, comprising an oscillator circuit having first and second circuit portions, each of which includes an electron tube having anode, cathode, and control electrodes, a coupling means common to said portions and including a circuit branch the reactance of which determines the magnitude of the coupling effected by said means and hence determines whether the oscillation of said portions is permitted or prevented, an adjustable reactance element included in said circuit branch and operative to vary the reactance thereof when adjusted to different values, a first point in said circuit branch at which the reactance, with respect to a common point, is different from the reactance of a second point in said circuit branch, with respect to said common point, for a given adjusted value of said element, means connecting said common point to the anodes and cathodes of said tubes, means connecting said first point to the control electrode of one of said tubes, means connecting said second point to the control electrode of the other of said tubes, first and second electro-responsive devices, conductors connecting one of said devices in series with the anode and cathode of one of said tubes to a first source of alternating current of a predetermined frequency, conductors connecting the other of said devices in series with the anode and cathode of the other of said tubes to a second source of alternating current of said frequency which is substantially 180 degrees out of phase with respect to said first source, and bias means included in said circuit and operative to control the operative energization of each of said devices in accordance with the state of oscillation of the respective one of said portions.

26. Control apparatus, comprising an electron tube having anode, cathode, and control electrodes, a coupling portion including an adjustable element connected between said electrodes and operative to permit or prevent the oscillation of said tube accordingly as said element is adjusted to a value respectively above or below a control point value, first and second electro-responsive devices, conductors connecting said first device and a first rectifier in series with the anode and cathode of said tube to a first source of alternating current of a predetermined frequency, conductors connecting said second device and a second rectifier in series with the anode and cathode of said tube to a second source of alternating current of said frequency which is substantially 180 degrees out of phase with respect to said first source, said first rectifier being operative to permit current flow through said first device solely from said first source, and said second rectifier being operative to permit current flow through said second device solely from said second source, an impedance device, means operative to connect and disconnect said impedance device across said element alternately in synchronism with the alternating current of one of said sources, thereby to establish two different values of said control point alternately at said frequency, and bias means connected to said tube and operative, when said tube is not oscillating, to decrease the internal anode-cathode resistance of said tube substantially below the value corresponding to oscillation of said tube.

27. Control apparatus, comprising an oscillator circuit having first and second portions, a separate responsive device individual to each of said portions and operative to assume one or another condition depending upon the flow of courrent in the corresponding portion, a single adjustable impedance element included in said circuit and operative, when adjusted to one value, to permit oscillation of said circuit, and operative, when adjusted to another value, to prevent oscillation of said circuit, means operative to permit current flow in said first and second portions when said circuit is not oscillating, and to reduce substantially current flow in said first and second portions when said circuit is oscillating, first means connected to said first and second portions and operative to permit current flow in solely one of said first and second portions during first periods which alternate with second periods during which current flow is permitted solely in the other of said first and second portions, whereby the flow of current in said first and second portions is jointly controlled by said first means and by the state of oscillation of said circuit, and second means electrically connected to said element and operative solely during said first periods effectively to establish a first control point value of said element on one or the other side of which the latter respectively permits and prevents oscillation of said circuit, and operative during solely said second periods effectively to change said control point value by a predetermined amount, whereby a given change in the adjustment of said element is operative to actuate one of said devices from one condition to the other without actuating the other of said devices from one condition to the other.

28. Control apparatus, comprising an oscillator circuit having first and second portions, a first current responsive device electrically connected in a corresponding one of said portions, a second current responsive device electrically connected in the other of said portions, each of said responsive devices being operative to assume a first condition in the presence of current flow of predetermined magnitude in the corresponding one of said portions, and to assume a second condition in the absence of such current flow, a single adjustable impedance device included in said circuit and operative, when adjusted to one value, to permit oscillation of said circuit, and operative, when adjusted to another value, to prevent oscillation of said circuit, means operative to permit current flow of said predetermined magnitude in said first and second portions when said circuit is not oscillating and to reduce current flow in said first and second portions substantially below said predetermined magnitude when said circuit is oscillating, first means connected to said first and second portions and operative to permit current flow in said first portion during first periods which alternate with second periods during which current flow is permitted in said second portion, and operative to prevent current flow in said second portion during said first periods and to prevent current flow in said first portion during said second periods, whereby current of said predetermined magnitude is caused to flow in said first portion solely when said circuit is not oscillating during said first periods, and is caused to flow in said second portion solely when said circuit is not oscillating during said second periods, and second means electrically connected to said element and operative solely during said first periods effectively to establish a first control point value of said element on one or the other side of which the latter respectively permits and prevents oscillation of said circuit, and operative during solely said second periods effectively to change said control point value by a predetermined amount, whereby a given change in the adjustment of said element is operative to actuate said first device from one of said conditions to the other without actuating said second device from one of said conditions to the other.

References Cited in the file of this patent

UNITED STATES PATENTS

| | | |
|---|---|---|
| 2,468,138 | Terry | Apr. 26, 1949 |
| 2,531,313 | Wannamaker, Jr. | Nov. 21, 1950 |
| 2,574,383 | Gaddis | Nov. 6, 1951 |
| 2,584,728 | Michel | Feb. 5, 1952 |